US012607309B2

(12) United States Patent
Neal

(10) Patent No.: US 12,607,309 B2
(45) Date of Patent: Apr. 21, 2026

(54) RECHARGEABLE LUMINAIRE MODULE AND CORDLESS LIGHT FIXTURE THAT ACCOMMODATES THE SAME

(71) Applicant: VISUAL COMFORT OF AMERICA LLC, Houston, TX (US)

(72) Inventor: Charles B. Neal, Houston, TX (US)

(73) Assignee: VISUAL COMFORT OF AMERICA LLC, Houston, TX (US)

( * ) Notice: Subject to any disclaimer, the term of this patent is extended or adjusted under 35 U.S.C. 154(b) by 0 days.

(21) Appl. No.: 18/678,752

(22) Filed: May 30, 2024

(65) Prior Publication Data

US 2025/0122983 A1 Apr. 17, 2025

Related U.S. Application Data

(60) Provisional application No. 63/590,775, filed on Oct. 16, 2023.

(51) Int. Cl.
*F21L 4/08* (2006.01)
*F21V 3/06* (2018.01)
(Continued)

(52) U.S. Cl.
CPC .............. *F21L 4/08* (2013.01); *F21V 3/0615* (2018.02); *F21V 21/0965* (2013.01);
(Continued)

(58) Field of Classification Search
CPC .......... F21L 4/08; F21V 29/503; F21V 29/70; F21V 3/0615; F21V 21/0965; F21V 23/0414; F21V 23/06
See application file for complete search history.

(56) References Cited

U.S. PATENT DOCUMENTS

2004/0212991 A1* 10/2004 Galli ..................... F21V 29/767 362/157
2006/0262523 A1* 11/2006 Smith ..................... F21L 4/085 362/157
(Continued)

FOREIGN PATENT DOCUMENTS

CN 108302419 A 7/2018
CN 217763090 U 11/2022
(Continued)

OTHER PUBLICATIONS

Amazon.com, Inc., "SCOPOW 2Packs E26 Rechargeable Light Bulbs with Remote Control Timer and 3 Color Temperature, 350LM, Magnetically, Battery Operated Light Bulbs, Dimmer, for Non-Hardwired (E26, 2)", (2024). Retrieved from Internet on May 30, 2024: URL: <https://www.amazon.com/SCOPOW-Rechargeable-Temperature-Magnetically-Non-Hardwired/dp/B0CP8Q6223/ref=sr_1_7?crid=1VWREHTHAY41Z&dib=eyJ2ljoiMSJ9.Bp1RdMzGc6R40qjmj3XRw0RQf0MRdEGEwYLsentfwB7r0eOx9IHIRJG05LAHLwiMAahZOAbWV7DJ-t1d9j4Hq-BRLJC_9dLQkqQfYcaT5HVd-dX9nHAYAYbfgWo6QKO9w1sS_J0b1SNKEBD7la7eLkei710lze0Dr916a94m_K_qSOZgD7XuZux-R3IKK0xhWW2a6aUs-nILFKBjGSQLJp59CVebG3JHCk2ARQ-i7ntx30gWwOEAXa2yTP2nPCI5bVxO7ktzUuS15RN8YZu7NpKzfNdQ18bmjNzVSDsafQA.eBmraS8moHndOZFqhLJDHFk3TpKBa4AgsLvCQp47TRE&dib_tag=se&keywords=rechargeable%2Bbulbs%2Bmagnetic&qid=1717006345&sprefix=rechargeable%2Bbulbs%2Bmagneti%2Caps%2C154 &sr=8-7&th=1>.
(Continued)

*Primary Examiner* — Gerald J Sufleta, II
(74) *Attorney, Agent, or Firm* — MARSHALL, GERSTEIN & BORUN LLP

(57) ABSTRACT

The rechargeable luminaire includes a housing and a diffuser. The diffuser is configured to be coupled to the housing
(Continued)

to form a stand-alone assembly, and is composed of a white glass that diffuses light in a predetermined manner. The rechargeable luminaire further includes a battery, a light source, and a heat sink disposed within the stand-alone assembly. The light source is powered by the battery, and the heat sink is adjacent to the battery and the light source and is configured to dissipate heat from the battery and the light source.

22 Claims, 25 Drawing Sheets

(51) Int. Cl.

| | |
|---|---|
| ***F21V 21/096*** | (2006.01) |
| ***F21V 23/04*** | (2006.01) |
| ***F21V 23/06*** | (2006.01) |
| ***F21V 29/503*** | (2015.01) |
| ***F21V 29/70*** | (2015.01) |
| *F21Y 107/30* | (2016.01) |
| *F21Y 115/10* | (2016.01) |

(52) U.S. Cl.

CPC .......... *F21V 23/0414* (2013.01); *F21V 23/06* (2013.01); *F21V 29/503* (2015.01); *F21V 29/70* (2015.01); *F21Y 2107/30* (2016.08); *F21Y 2115/10* (2016.08)

(56) References Cited

U.S. PATENT DOCUMENTS

| | | | | |
|---|---|---|---|---|
| 2008/0002416 | A1 | 1/2008 | Liaw et al. | |
| 2010/0128483 | A1* | 5/2010 | Reo | F21V 5/00 362/249.02 |
| 2012/0033415 | A1 | 2/2012 | Sharrah et al. | |
| 2018/0320829 | A1* | 11/2018 | Wan | F21V 23/006 |
| 2020/0263855 | A1* | 8/2020 | Young | F21V 23/02 |
| 2020/0292154 | A1* | 9/2020 | Benn | H01R 33/18 |
| 2023/0146822 | A1* | 5/2023 | Hierzer | F21V 29/773 362/183 |

FOREIGN PATENT DOCUMENTS

| | | | |
|---|---|---|---|
| EP | 3098497 | A1 | 11/2016 |
| KR | 101241849 | B1 | 3/2013 |

OTHER PUBLICATIONS

Pooky Lighting Inc., "Katherine Cordless Table Lamp", (2024). Retrieved from Internet on May 30, 2024: URL: <https://www.us.pooky.com/collections/cordless-lamps/products/katherine-cordless-table-lamp?tab=description-tab>.

International Search Report and Written Opinion, International Application No. PCT/US2024/48293, mailed Jan. 2, 2025.

* cited by examiner

RECHARGEABLE LUMINAIRE MODULE AND CORDLESS LIGHT FIXTURE THAT ACCOMMODATES THE SAME

FIELD OF THE DISCLOSURE

The present disclosure generally relates to luminaires and, more particularly, to a rechargeable luminaire and a cordless light fixture that accommodates the same.

BACKGROUND

Conventionally, light fixtures include an electrical cord that must be plugged into an electrical outlet in order to power the light fixture. However, these electrical cords are often unwieldy, tend to get in the way of other items, and can pose a safety threat (e.g., cords can deteriorate with continued use, cords often pose a tripping hazard). Furthermore, these electrical cords are often short. That, coupled with the fact that electrical outlets cannot be easily moved, greatly reduce the possible options for locating the light fixture and may restrict a user's ability to move the light fixture if/when necessary.

SUMMARY

In accordance with a first exemplary aspect of the present disclosure, a rechargeable luminaire is configured for use with a cordless light fixture. The rechargeable luminaire includes a housing and a diffuser. The diffuser is configured to be coupled to the housing form a stand-alone assembly and includes a white glass that diffuses light in a predetermined manner. The rechargeable luminaire further includes a battery, a light source, and a heat sink disposed within the stand-alone assembly. The light source is powered by the battery, and the heat sink is adjacent to the battery and the light source and is configured to dissipate heat from the battery and the light source.

BRIEF DESCRIPTION OF THE DRAWINGS

In order to complement the description being made and in order to assist in a better understanding of the features of the invention, in accordance with a preferred example of a practical embodiment thereof, a set of drawings is attached hereto as an integral part of the said description, in which the following is illustratively and non-limitingly depicted.

DETAILED DESCRIPTION

Figure 1:
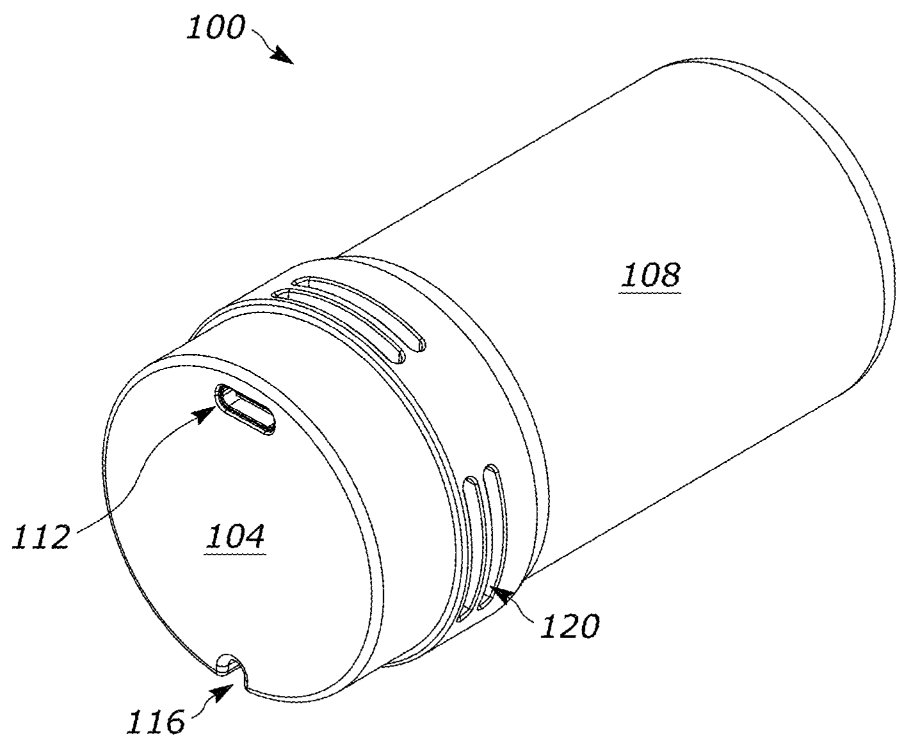
FIG. 1 shows a perspective view of one example of a rechargeable luminaire constructed in accordance with the teachings of the present disclosure.

The present disclosure aims to address the problems discussed above as well as other problems related to the use of conventional light fixtures. To this end, the present disclosure provides a rechargeable luminaire that serves as a stand-along light source, is portable, and is usable with cordless lamps and other cordless light fixtures. Recharge can be accomplished when the cordless lamp or other cordless light fixture is not in use, and the cordless lamp or other cordless light fixture can be used anywhere that is necessary for the current circumstances without having to worry about the location of furniture or electrical outlets. Furthermore, the rechargeable luminaire permits the cordless lamp or other cordless lighting device to be designed with aesthetic design at the forefront as an electrical cord is unnecessary.

FIGS. 1-13 illustrate one example of a rechargeable luminaire 100 constructed in accordance with the teachings of the present disclosure. The rechargeable luminaire 100 generally includes a housing 104, a diffuser 108, and a dimmer 124 coupled to the diffuser 108. In the present example, the housing 104 is coupled to the diffuser 108 and the dimmer 124 to form a stand-alone, self-supporting, enclosed assembly. Furthermore, the rechargeable luminaire 100 generally includes a battery 128, a light source 132 powered by the battery 128, and a heat sink 136. In the present example, the battery 128, the light source 132, and the heat sink 136 are each enclosed within the stand-alone assembly, with the heat sink 136 disposed adjacent to the battery 128 and the light source 132, and configured to dissipate heat generated by the battery 128 and the light source 132. In the present example, the dimmer 124 is configured to reconfigure the rechargeable luminaire 100 between a plurality of different lighting states, and the diffuser 108 is composed of a white glass configured to diffuse light from the light source 132 in a predetermined manner. One of ordinary skill in the art will appreciate that the rechargeable luminaire 100 can include additional, different, or fewer components. For example, the rechargeable luminaire 100 can include a carrying case for the stand-alone assembly.

As best illustrated in FIGS. 1-2, 4-7, 9-10, and 12-13, the housing 104 has a substantially or predominantly cylindrical shape defined by a closed end of the rechargeable luminaire 100, an open end opposite the closed end, and a substantially circular wall extending between the closed end and the open end. However, one of ordinary skill in the art will appreciate that the housing 104 can instead have a different shape. For example, the housing 104 can instead have a square, rectangle, oval, triangle, or other suitable shape. Furthermore, although in the present example the housing 104 is relatively compact, one of skill in the art will appreciate that the length is adjustable as necessary to accommodate, for example, the battery 128, the light source 132, the heat sink 136.

Figure 9:
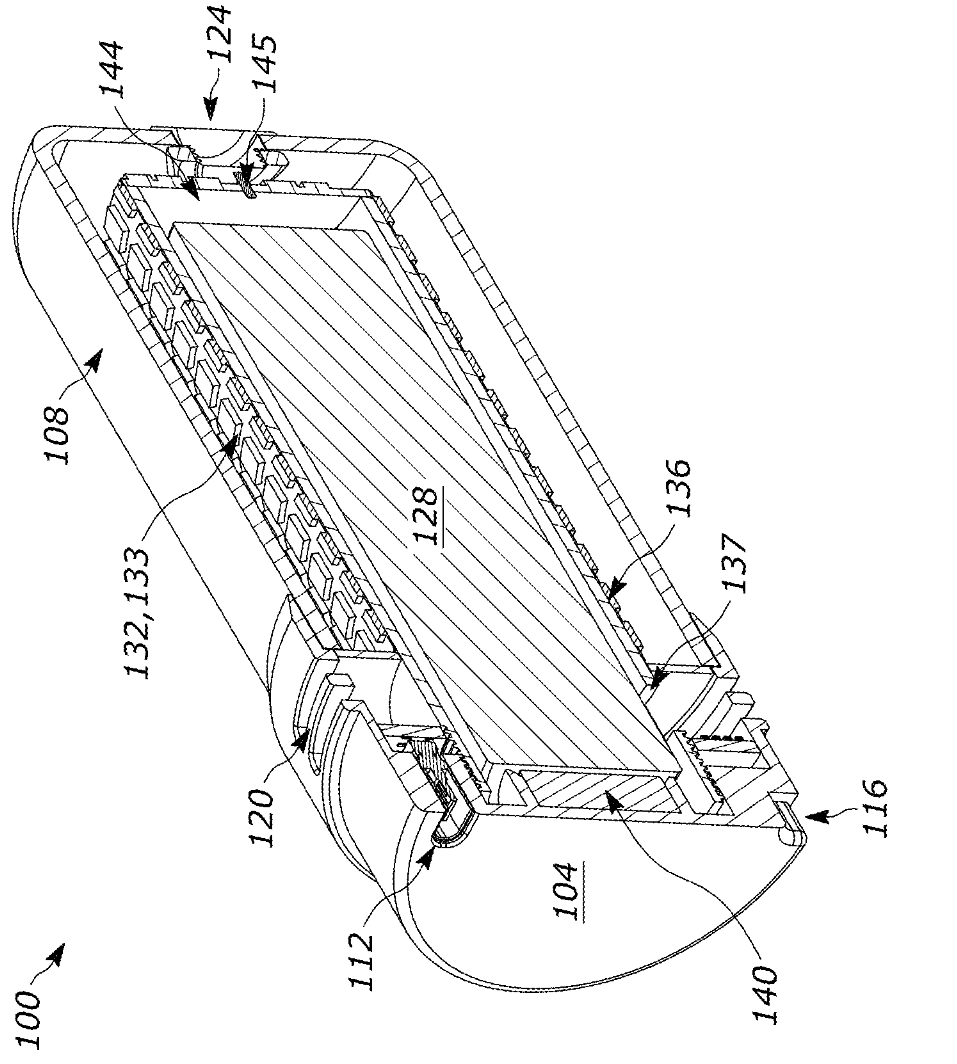
FIG. 9 shows a second cross-sectional view of the rechargeable luminaire.
Figure 10:
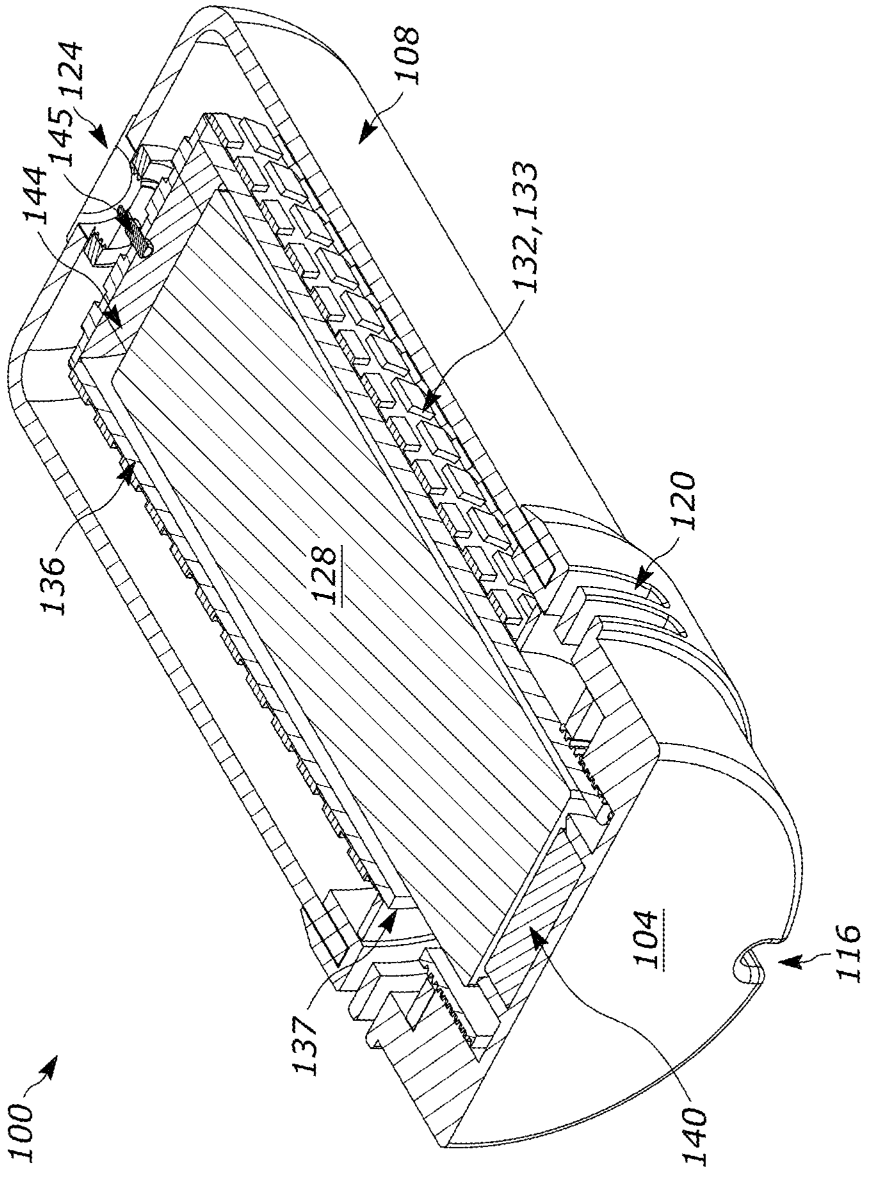
FIG. 10 shows a third cross-sectional view of the rechargeable luminaire.

Moreover, it will be appreciated that the housing 104 may be formed of one or more rigid or semi-rigid materials, including but not limited to any combination of metals, plastics, or other similar materials. For example, the housing 104 may be formed of a magnetic material such as aluminum, iron, nickel, or tin. Alternatively or additionally, as illustrated by FIG. 9, the rechargeable luminaire 100 can include a magnet 140 disposed within the housing 104, such that the magnet 140 is also enclosed within the stand-alone assembly. In the present example, the magnet 140 is a small disk-shaped magnet disposed against or immediately adjacent the closed end of the housing 104, but one of ordinary skill in the art would understand that the magnet 140 can have a different shape and/or be disposed elsewhere in the rechargeable luminaire 100.

Figure 2:
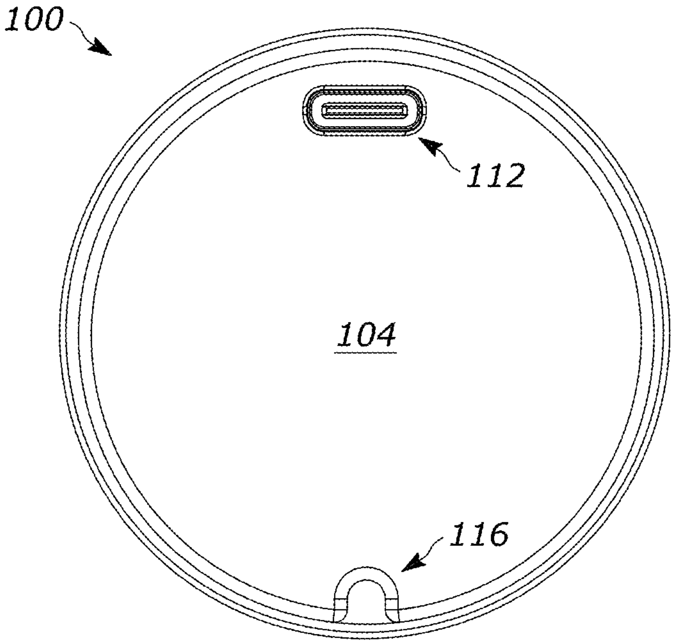
FIG. 2 shows a bottom view of the rechargeable luminaire.
Figure 3:
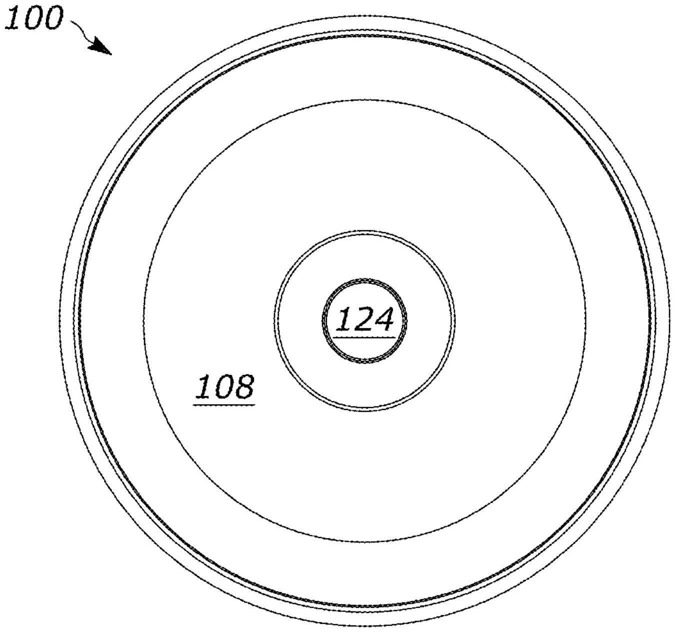
FIG. 3 shows a top view of the present example of the rechargeable luminaire.

As best illustrated by FIGS. 1 and 2, the housing 104 further includes a port 112, a notch 116, and one or more ventilation ports 120. In the present example, the port 112 is formed in the closed end of the housing 104 and is intended to recharge the battery 128 of the rechargeable luminaire 100 as desired. In the present example, the port 112 is a USB-C type charging port sized to receive a USB-C connector for recharging the battery 128. However, one of ordinary skill in the art will appreciate that the luminaire 100 can instead utilize a different charging port standard. For example, charging standard options for the port 112 include, but are not limited to, USB-A, USB-B, USB-B Mini, USB-B Micro, and Lightning. Moreover, although the port 112 is placed towards the peripheral edge of the closed end of the housing 104, one of ordinary skill in the art would understand that limitations of the battery may necessitate the port 112 being located on the curved sides of the housing 104, near or at the center of the closed end of the housing 104, or a different location. Furthermore, although in the present example the rechargeable luminaire 100 has one port 112, the rechargeable luminaire 100 can instead include two, three, or more than three ports 112, and a plurality of ports 112 may utilize differing charging standards. For example, the rechargeable luminaire 100 can include two USB-C ports.

The notch 116 is intended to be used to align the rechargeable luminaire 100 with a cordless lamp or other cordless light fixture. As illustrated by FIGS. 1-2, 5, and 12, the notch

116 of the present example has a C-shaped cross-section defined by an open end at the peripheral edge of the closed end of the housing 104 and rounded edges that extend radially inwardly from the peripheral edge. In other examples, however, the notch 116 can have a different depth, a different cross-sectional shape, or be in a different location. Moreover, although the rechargeable luminaire 100 of the present example has one notch 116, one of ordinary skill in the art would understand that the rechargeable luminaire 100 can instead include two, three, or more than three notches 116.

Figure 4:
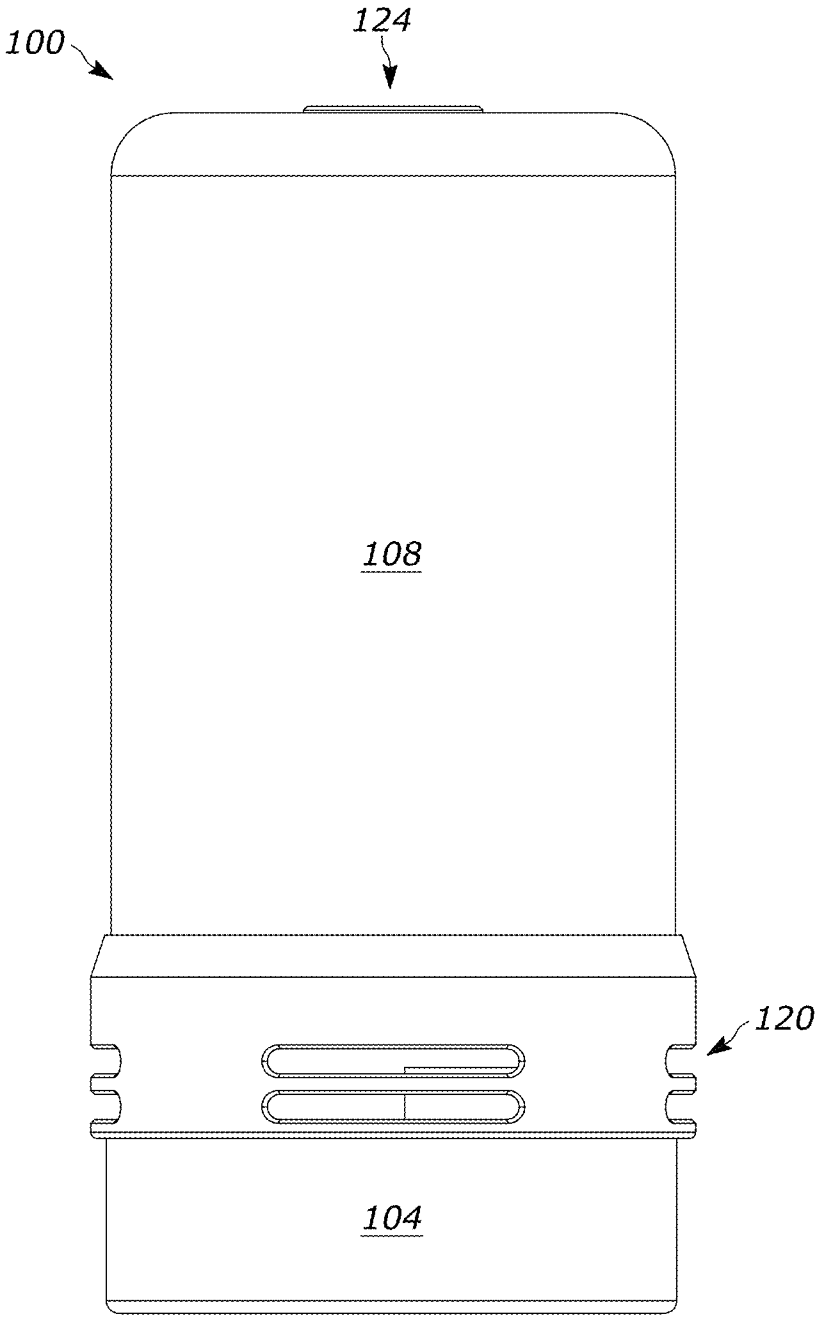
FIG. 4 shows a front view of the present example of the rechargeable luminaire.
Figure 5:
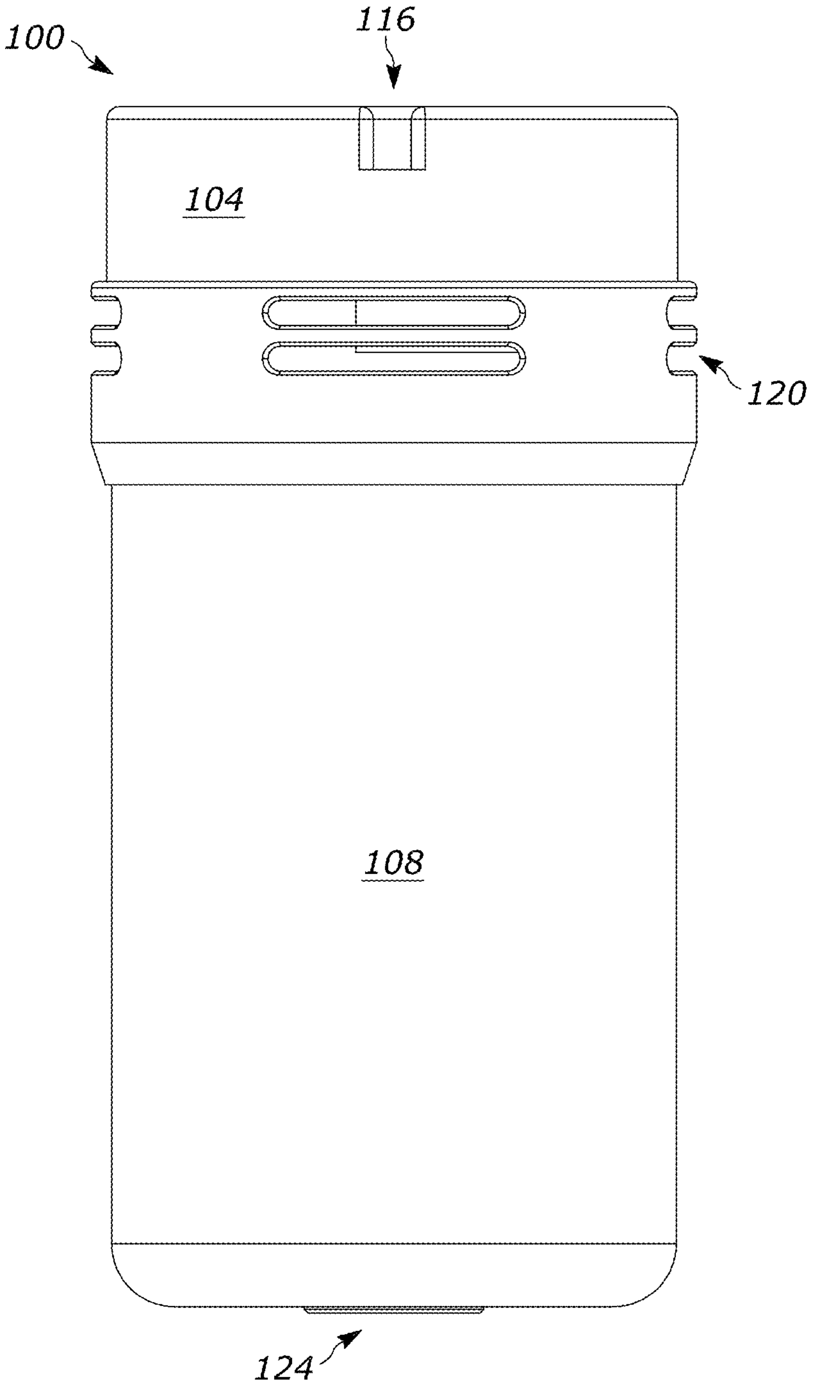
FIG. 5 is similar to FIG. 4, but rotated 180 degrees.
Figure 6:
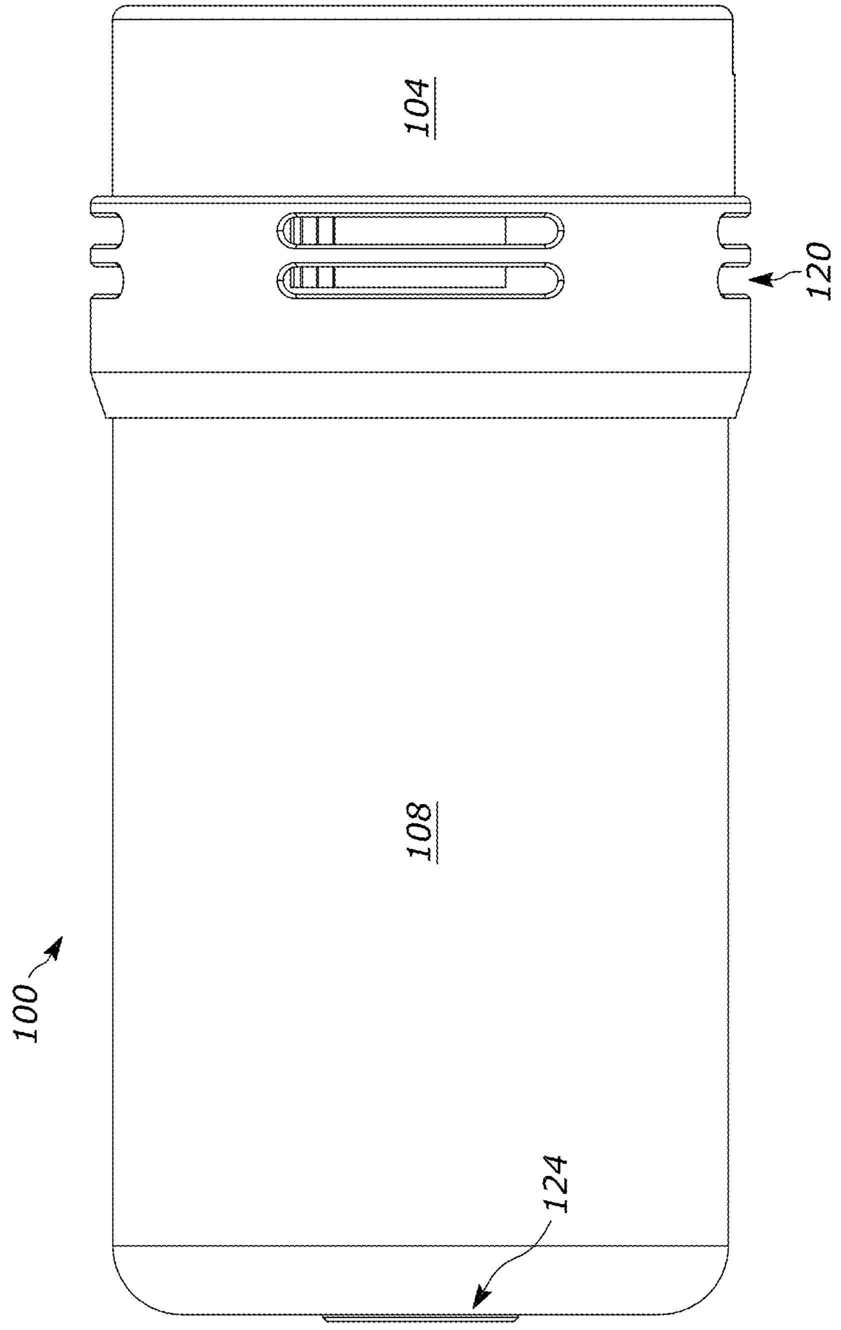
FIG. 6 is similar to FIG. 5, but rotated 90 degrees in a clockwise direction.
Figure 7:
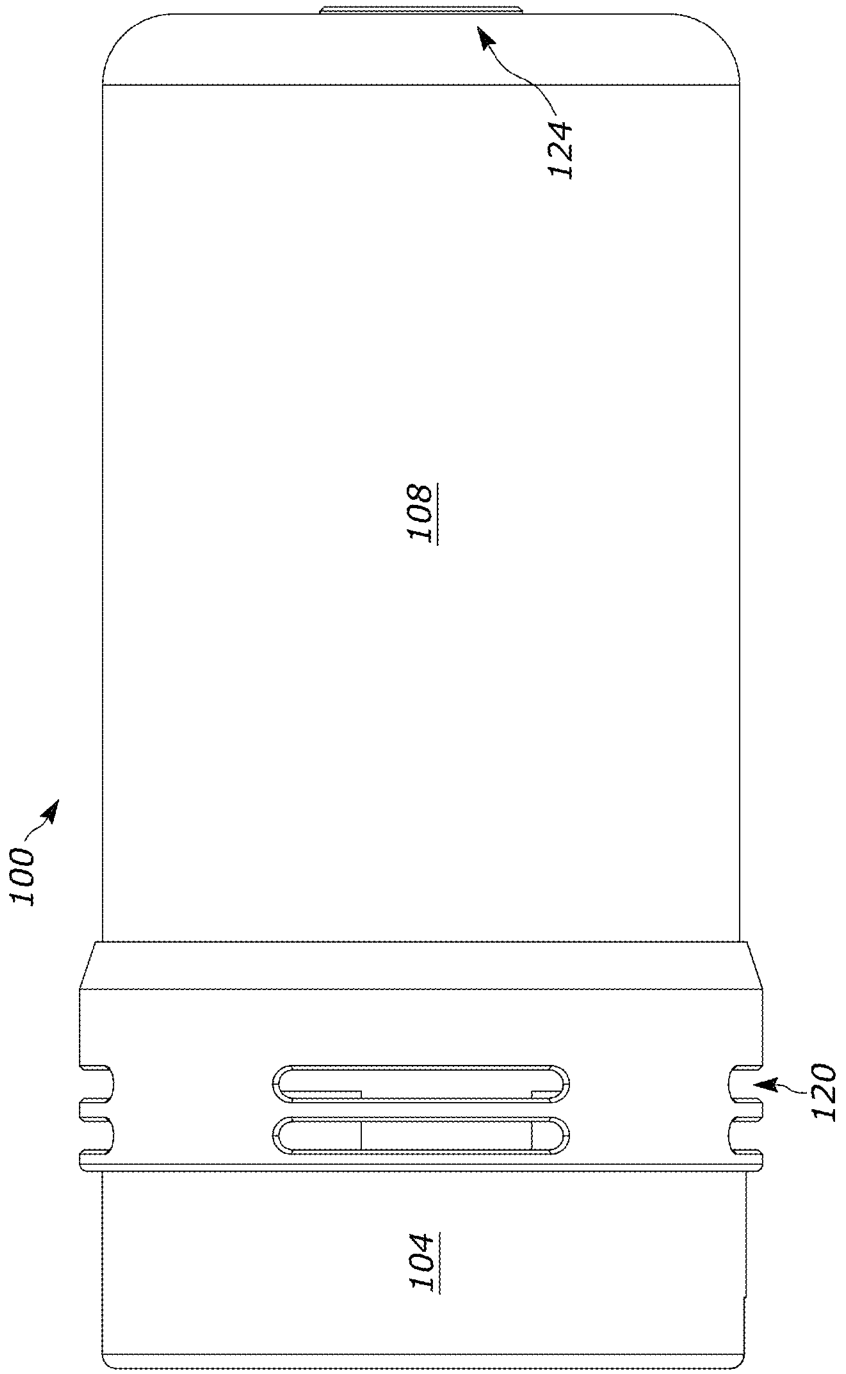
FIG. 7 is similar to FIG. 5, but rotated 90 degrees in a counter-clockwise direction.
Figure 8:
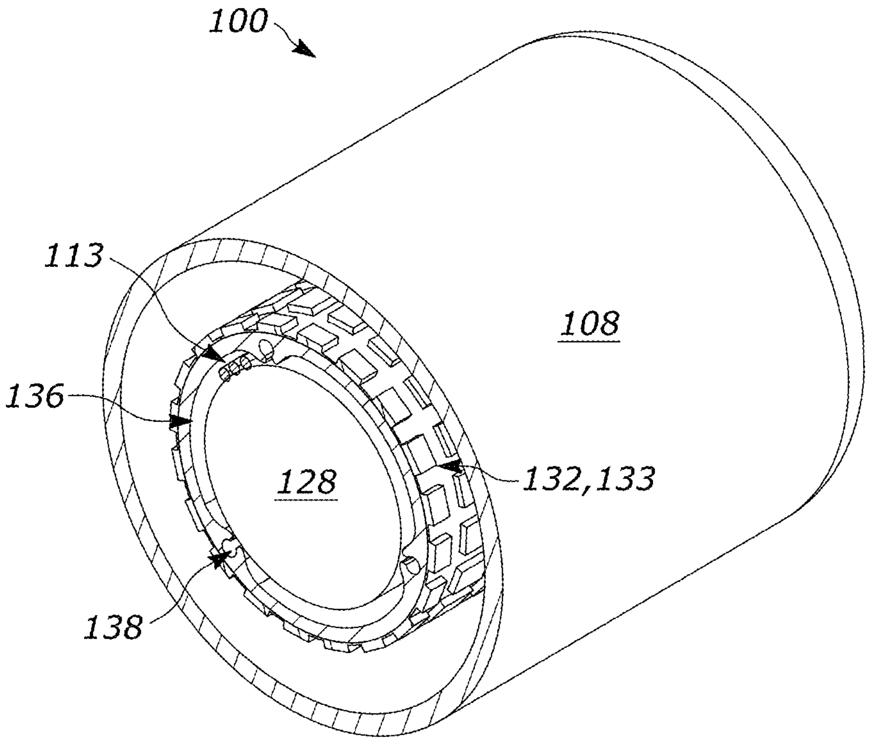
FIG. 8 shows a first cross-sectional view of the rechargeable luminaire.

The one or more ventilation ports 120 are configured to allow air to flow into and out of the rechargeable luminaire 100, thereby ventilating the battery 128, the light source 132, and the heat sink 136. As best illustrated by FIG. 4, the rechargeable luminaire 100 in the present example includes four sets of two predominantly pill-shaped, completely open, ports equally spaced every ninety degrees around the upper half of the curved sides of the housing 104. One of ordinary skill in the art, however, would understand that the one or more ventilation ports 120 can have a different shape, be located elsewhere, and/or be arranged differently. For example, the one or more ventilation ports 120 may have a rectangular, a circular, an oval, or any other suitable shape. One of ordinary skill in the art would also understand that the rechargeable luminaire 100 can include more or less than 8 ventilation ports 120. For example, the rechargeable luminaire 100 can include two equally spaced single openings covered by a grate or other similar cover to filter out large particles entering the enclosure of the housing 104.

The diffuser 108 is generally configured to diffuse light generated by the light source 132 as the light passes through the diffuser 108 and out of the rechargeable luminaire 100 and into the external environment surrounding the rechargeable luminaire 100. As illustrated by FIGS. 1, 3, and 4-13, the diffuser 108 of the present example has a predominantly or substantially cylindrically shape defined by a closed end, an open end opposite the closed end, and a wall that extends from the closed end to the open end and similarly sized to the wall of the housing 104. When the diffuser 108 is coupled to the housing 104, the open end of the diffuser 108 engages the open end of the housing 104. The diffuser 108 of the present example is formed of a cased white blown glass. In other examples, however, the diffuser 108 can have a different shape, a different size (e.g., a different length), and/or a different material. For example, the diffuser 108 can instead have a square, triangle, or any other suitable shape, and/or the diffuser 108 may have a cross-section that tapers or changes shape or form along the length of the diffuser 108. Moreover, the diffuser 108 may be shorter or longer than the present invention, and the closed end may be characterized by a different shape in place of the rounded predominantly spherical shape of the present example, including but not limited to an abrupt, sharp edge. As another example, the diffuser 108 can be formed of a different material suitable for diffusing light, including but not limited to an acrylic, polycarbonate, or plastic.

As best illustrated by FIGS. 3-7, 9-10, and 12-13, the dimmer 124 is coupled to (e.g., carried by) the closed end of the diffuser 108 and creates the enclosed stand-alone assembly with the diffuser 108 and housing 104. The dimmer 124 is intended to reconfigure the rechargeable luminaire 100 between a plurality of lighting states. Thus, the dimmer 124 allows a user of the rechargeable luminaire 100 to easily and quickly change the lighting state of the rechargeable luminaire 100. In the present example, the dimmer 124 is a capacitive touch sensor that allows the user to reconfigure the dimness level of the rechargeable luminaire 100 between a first lighting state associated with a fully lit mode, a second lighting state associated with a first partially lit mode, a third lighting state associated with a second partially lit mode (in which the rechargeable luminaire 100 emits a lighting level less than the second lighting state), and a fourth lighting state associated with a fully off mode. However, one of ordinary skill in the art would understand that the dimmer 124 may configure the rechargeable luminaire 100 between any number of lighting states, including but not limited to more partially lit modes, fewer or no partially lit modes, or a lit but flickering mode.

The battery 128 in the present example is a rechargeable lithium ion battery power stack that, when charged via the port 112, is configured to power the light source 132. As illustrated by FIGS. 8-13, the battery 128 of the present example is disposed within the enclosed stand-alone assembly formed by the housing 104, diffuser 108, and dimmer 124. More particularly, as best illustrated in FIG. 9, the battery 128 of the present example is substantially cylindrically shaped and extends substantially entirely between the closed end of the housing 104 and the closed end of the diffuser 108. One of ordinary skill in the art will, however, understand that the battery 128 can instead have a different size and/or shape, including but not limited to that of a box or pill. For example, the battery 128 can have a length that is less than the length of the battery 128 illustrated in FIG. 9. Additionally, one of ordinary skill in the art would understand that the battery 128 can instead be made of alternative but equally suitable material or type, including but not limited to a rechargeable sodium ion battery or a single-use battery, Either way, the battery 128 can be removable (e.g., for charging, for replacement, for maintenance).

Like the battery 128, FIGS. 8-13 best illustrate that the light source 132 in the present example is disposed within the enclosed stand-alone assembly of the housing 104, diffuser 108, and dimmer 124. In turn, the light source is 132 is immediately adjacent to the heat sink 136. More particularly, the light source 132 circumferentially surrounds the heat sink 136 and is offset within the enclosed stand-alone assembly toward the closed end of the diffuser 108 so that the light source 132 is generally aligned with the diffuser 108. One of ordinary skill in the art will understand, however, that the light source 132 may be arranged differently (e.g., offset from the heat sink 136 and/or may not circumferentially surround the heat sink as a single mechanically and electrically connected light source 132).

Moreover, in the present example, the light source 132 is hollow, open at both ends, and substantially cylindrical. Preferably, the light source 132 is composed of a printed circuit board ("PCB") and a plurality of light-emitting diodes ("LEDs") 133 mounted to the printed circuit board wrapped around the heat sink 136, such that the LEDs 133 are equally spaced around the battery 128 and the heat sink 136. In the present example, the light source 132 is composed of a total 340 LEDs placed in 20 equally spaced and numbered rows that run parallel to the length of the rechargeable luminaire 100. However, one of ordinary skill in the art would understand that the number and spacing of the LED diodes 133 composing the light source 132 can be altered. For example, the light source 132 can include more or less than 340 LEDs 133 and/or the LEDs 133 may be spaced in a different pattern, including but not limited to a pattern that does not create rows running parallel to the length of the rechargeable luminaire 100. As another example, the light source 132 can take the form of one or more strips of LEDs in place of the LED diodes arranged in rows. The light source 132 may also instead take the form of a different type of light-emitting components, including but not limited to fluorescent, incandescent, or CFL lights, or it may be composed of.

Figure 11:
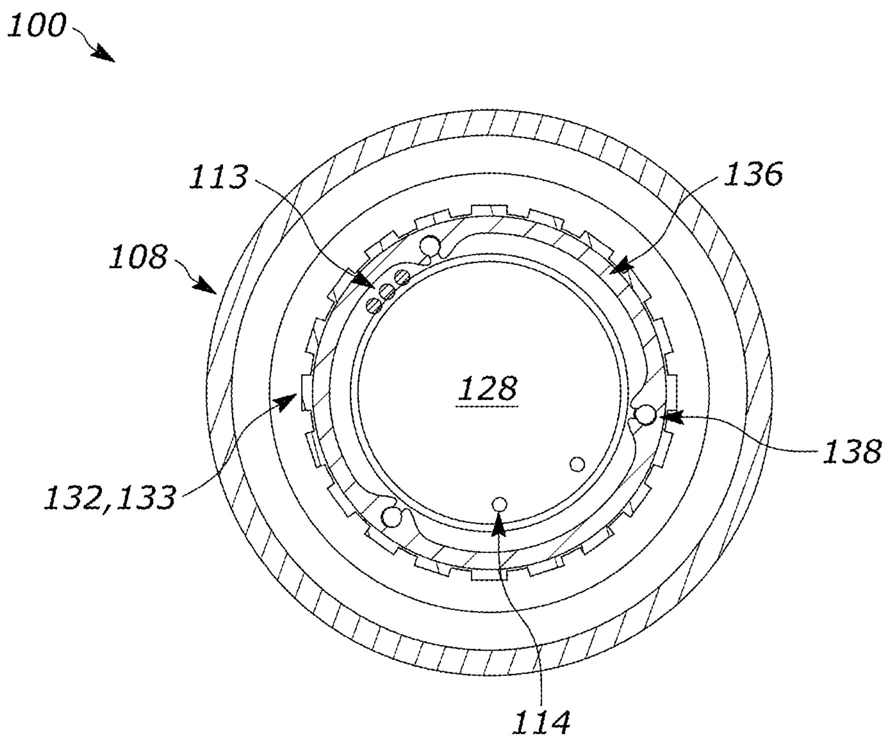
FIG. 11 shows a top view of FIG. 8.
Figure 12:
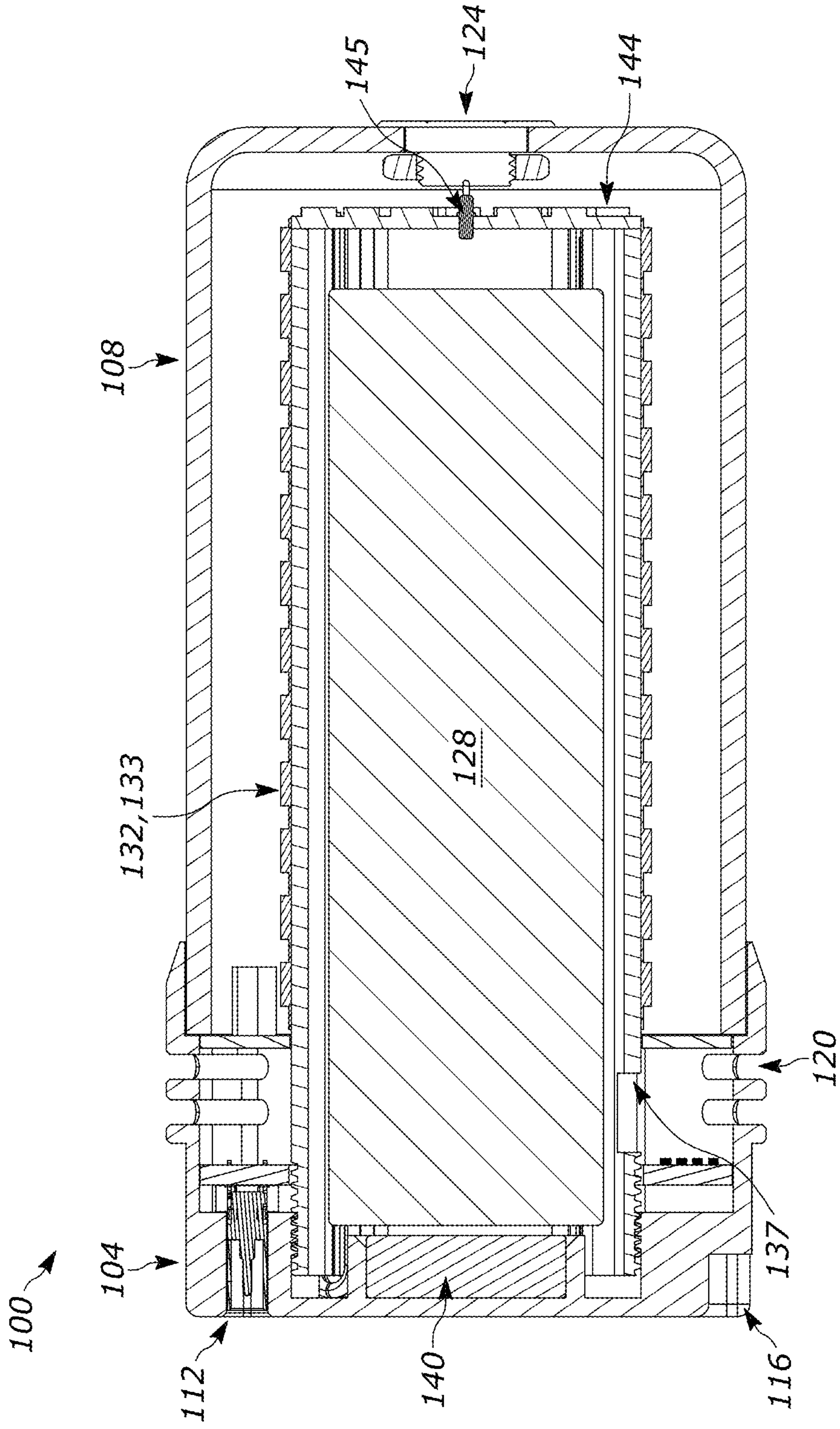
FIG. 12 shows a front view of FIG. 9.
Figure 13:
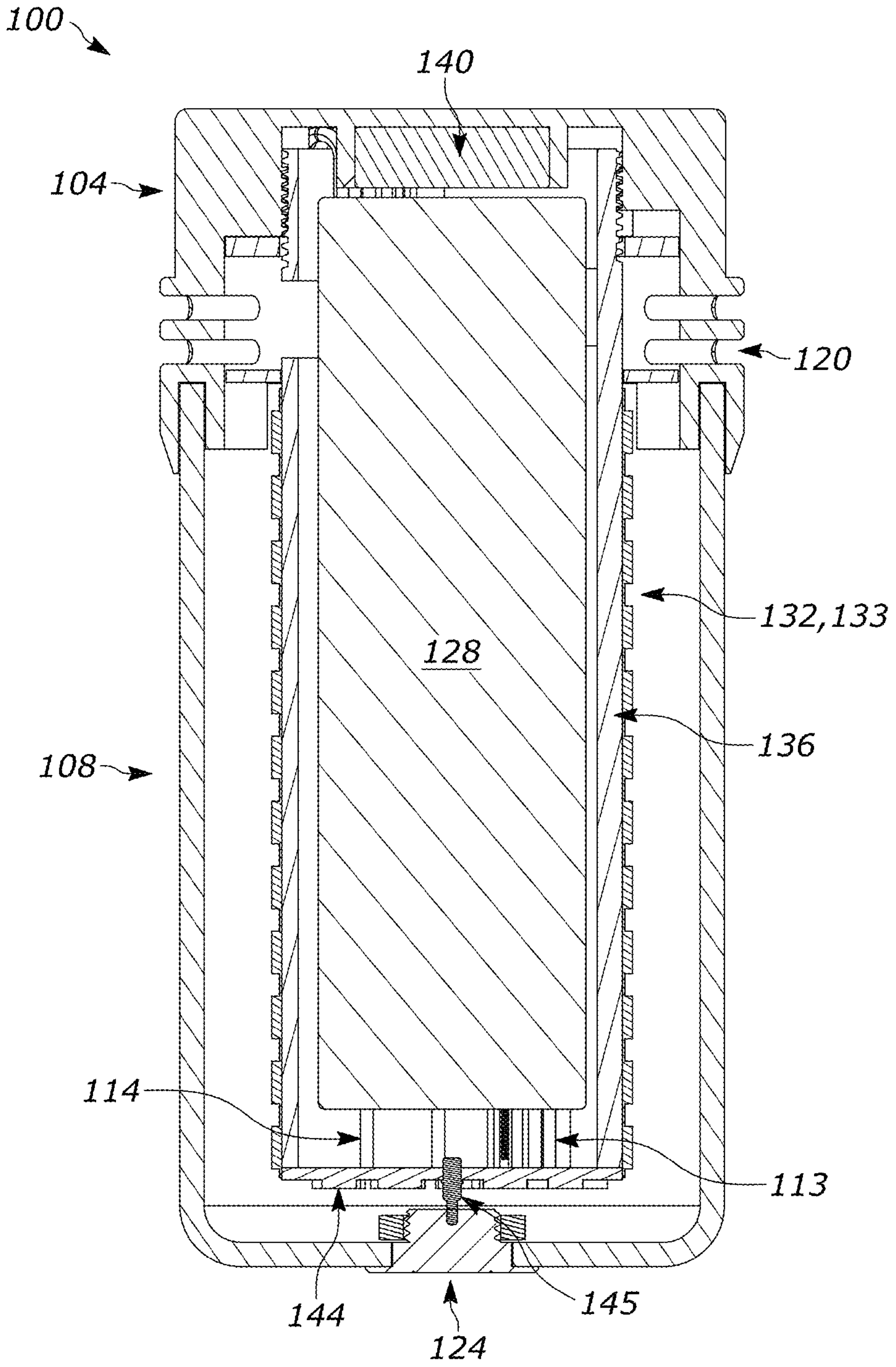
FIG. 13 shows a front view of FIG. 10, but rotated 180 degrees.
Figure 14:
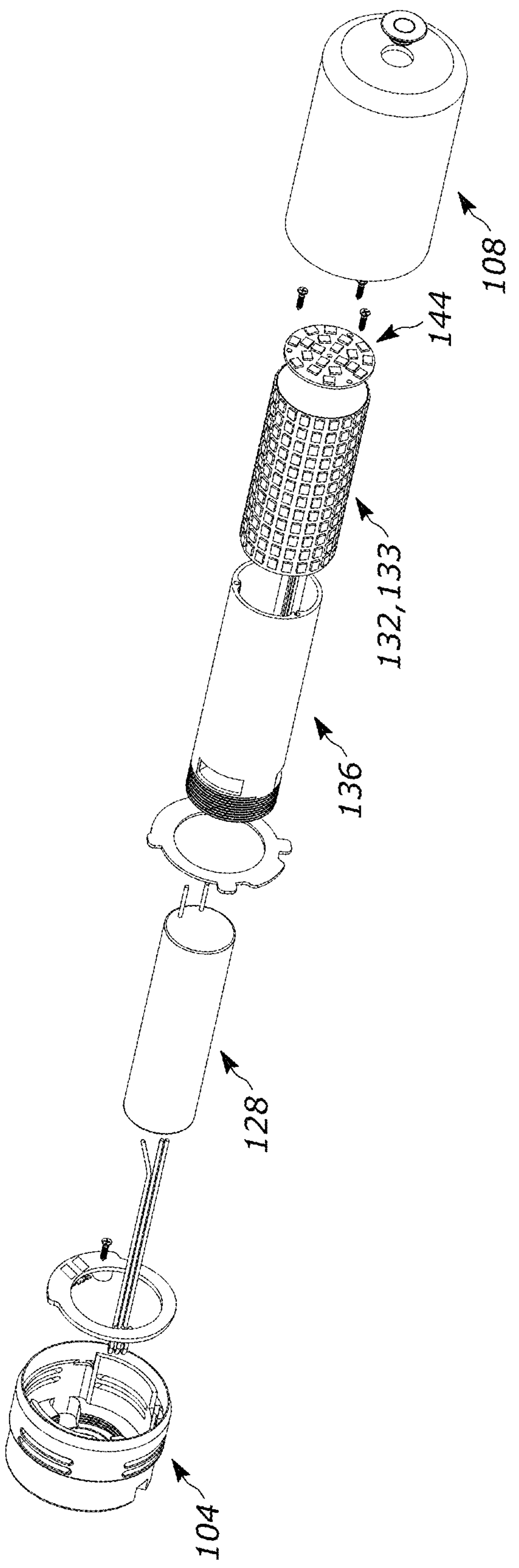
FIG. 14A shows a first exploded view of the rechargeable luminaire.
FIG. 14B shows a second exploded view of the rechargeable luminaire.

The heat sink 136 is generally configured to dissipate at least some of the heat generated by the battery 128 and the light source 132. As illustrated in FIGS. 8-13, the heat sink 136 in the present example is disposed within the enclosed stand-alone assembly defined by the housing 104, diffuser 108, and dimmer 124. More particularly, the heat sink 136 is thermally coupled to the light source 132 and adjacent but offset from the battery 128, such that the heat sink 136 is partially disposed between the battery 124 and the light source 128. Additionally, as best illustrated by FIG. 11, the heat sink 136 in the present example is hollow, open at both ends, and substantially cylindrical. At the end closest to the housing 104, the heat sink 136 has one or more annular ports 137 intended to be in fluid communication with the ventilation ports 120. In the present example, the heat sink 136 has three annular ports 137 equally spaced around the circumference of the heat sink 136. However, one of ordinary skill in the art would understand that the heat sink 136 can include one port 137, two ports 137, or more than three ports 137, depending, for example, upon the number and arrangement of the ventilation ports 120. In any event, the annular ports 137 allow (presumably cooler) air that has entered the luminaire 100 via the ventilation ports 120 to thermally contact a portion of the heat sink 136 as well as a portion of the battery 128, thereby cooling the heat sink 136 and the battery 128.

As best illustrated in FIG. 11, the heat sink 136 has three equally spaced protrusions 138 that extend radially inward from the inner surface of the heat sink 136 and toward the battery 128. Each protrusion has an aperture sized to receive a fastener for coupling the heat sink 136 to a circuit board 144 immediately adjacent the closed end of the diffuser 108. In other examples, however, the heat sink can have more or less protrusions 138, and the cross-sectional shape of the heat sink 136 may be that of other shapes including but not limited to a square, triangle, hexagon, or other suitable shape as necessary relative to the shape of the light source 132, the battery 128, or the diffuser 108. Additionally, the heat sink 136 in the present example is made of aluminum, but one of ordinary skill in the art would understand that the heat sink can be made of other materials with suitable thermal properties, including but not limited to copper or ceramic. Moreover, one of skill in the art would understand that the heat sink 136 can be made by techniques including but not limited to spinning, deep draw, die casting, or additive manufacturing.

In the present example, the length of the light source 132 is less than that of the heat sink 136 because the length of the light source 132 should generally correspond to the length of the diffuser 108. One of ordinary skill in the art will appreciate that it would be inefficient to extend the light source 132 so as to be disposed within the housing 104, as that light would not be diffused out of the rechargeable luminaire 100. In contrast, the heat sink 136 can be disposed in the housing 104, as the heat sink dissipates heat from the battery 128 that, in the present example, stretches into the diffuser 104. However, in other examples, the length of the heat sink 136 may be the same as or shorter than the length of the light source 132, including when the length of the battery 128 is shorter than that of the present example.

As best illustrated by FIGS. 9-10 and 12-13, the circuit board 144 is electrically and mechanically connected and mechanically connected to the port 112, the dimmer 124, the battery 128, and the light source 132, and only mechanically connected to the heat sink 136. First, the circuit board 144 is mechanically and electrically connected to the port 112 via one or more first wires 113. Moreover, the battery 128 is mechanically and electrically connected to the circuit board 144 via one or more second wires 114. Together, the first wires 113 and the second wires 114 transfer electricity from the port 112 to the battery 128 via the circuit board 144. The one or more first wires 113 and one or more second wires 114 are well known in the art, so further details are omitted in the interest of brevity. Second, the circuit board 144 is connected both mechanically and electrically to the dimmer 124 via wires within the prong 145. Third, the light source 132 and, subsequently, the LED diodes 133 are electrically connected to the circuit board 144 via conventional electrical wiring (not shown). Furthermore, while difficult to observe in the FIGS., the light source 132 is mechanically connected to the circuit board 144 via adhesive or weld.

Figure 15:
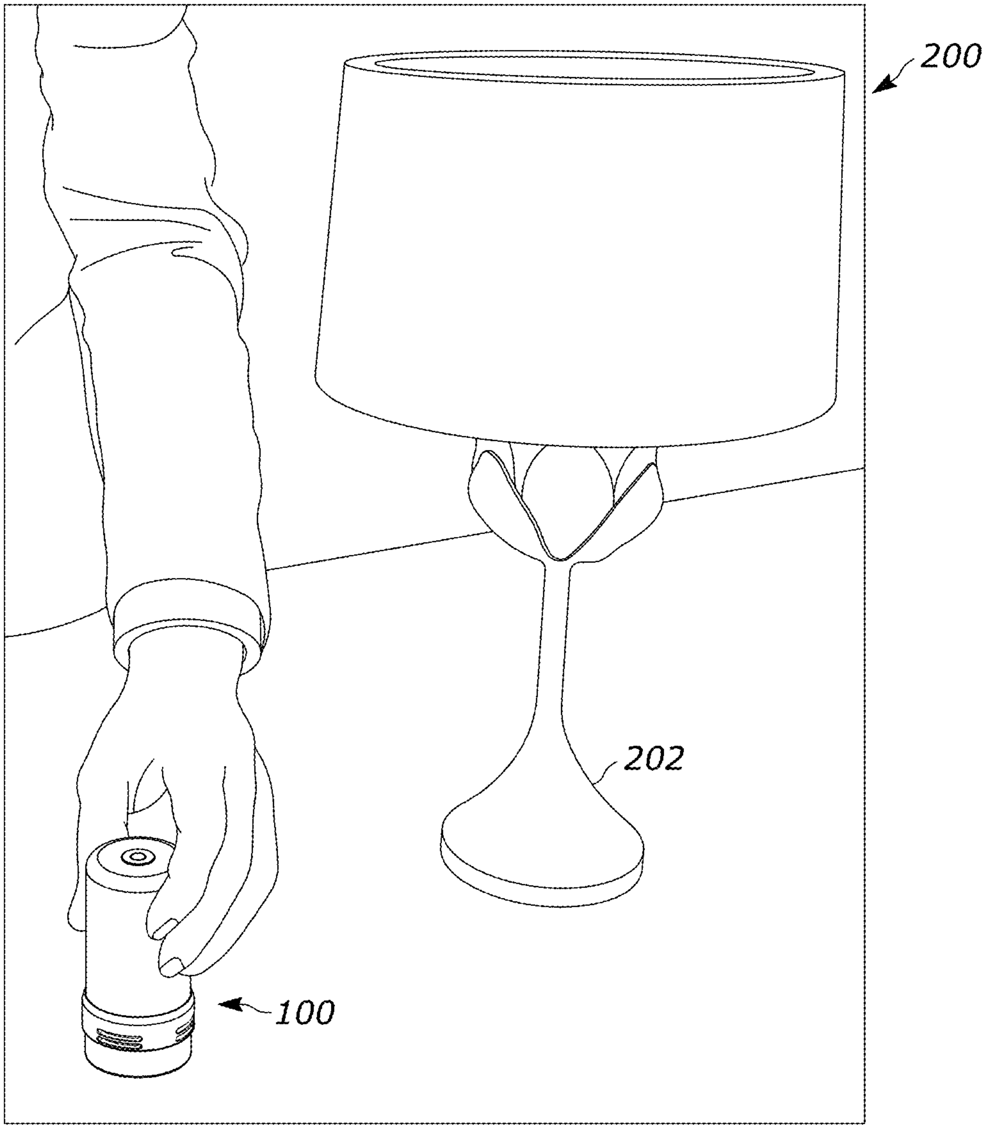
FIG. 15 shows the rechargeable luminaire adjacent and uncoupled from one example of a cordless light fixture.
Figure 16:
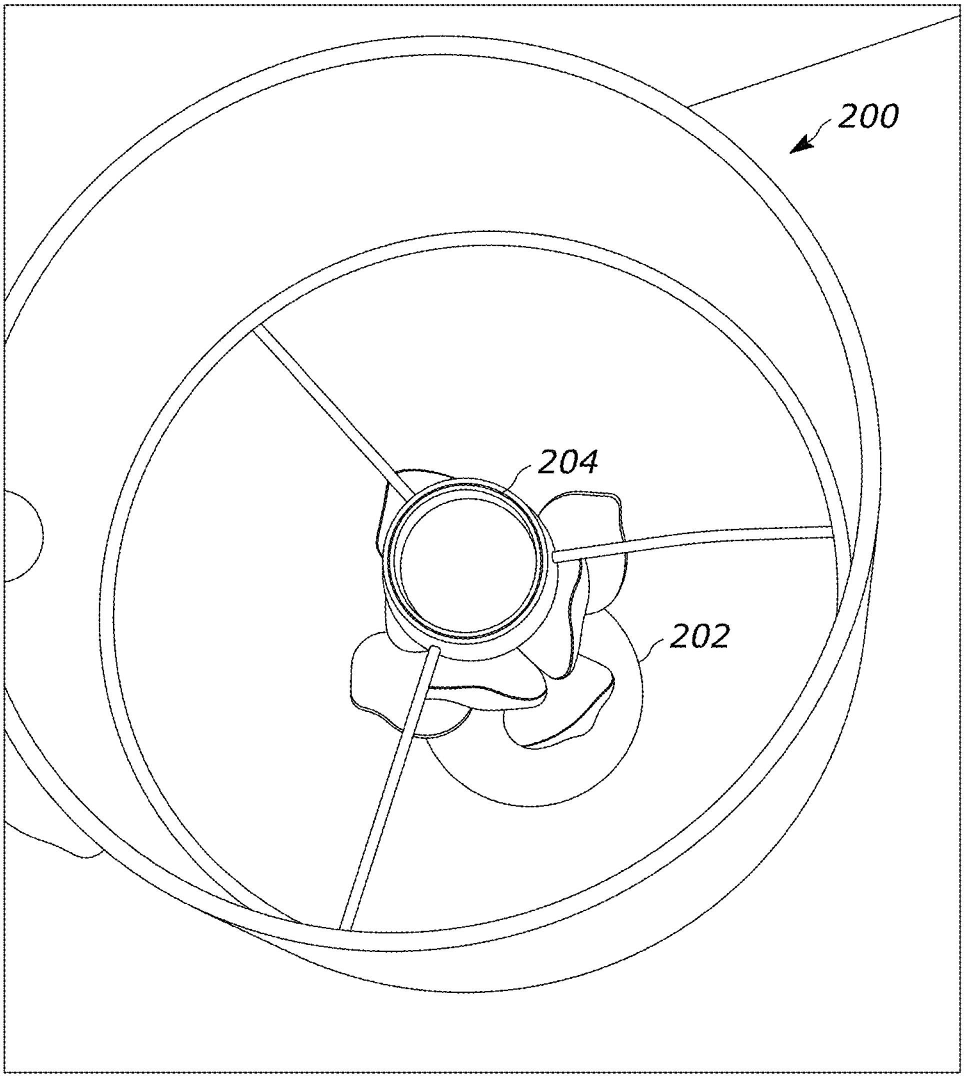
FIG. 16 shows a top view of the cordless light fixture.
Figure 17:
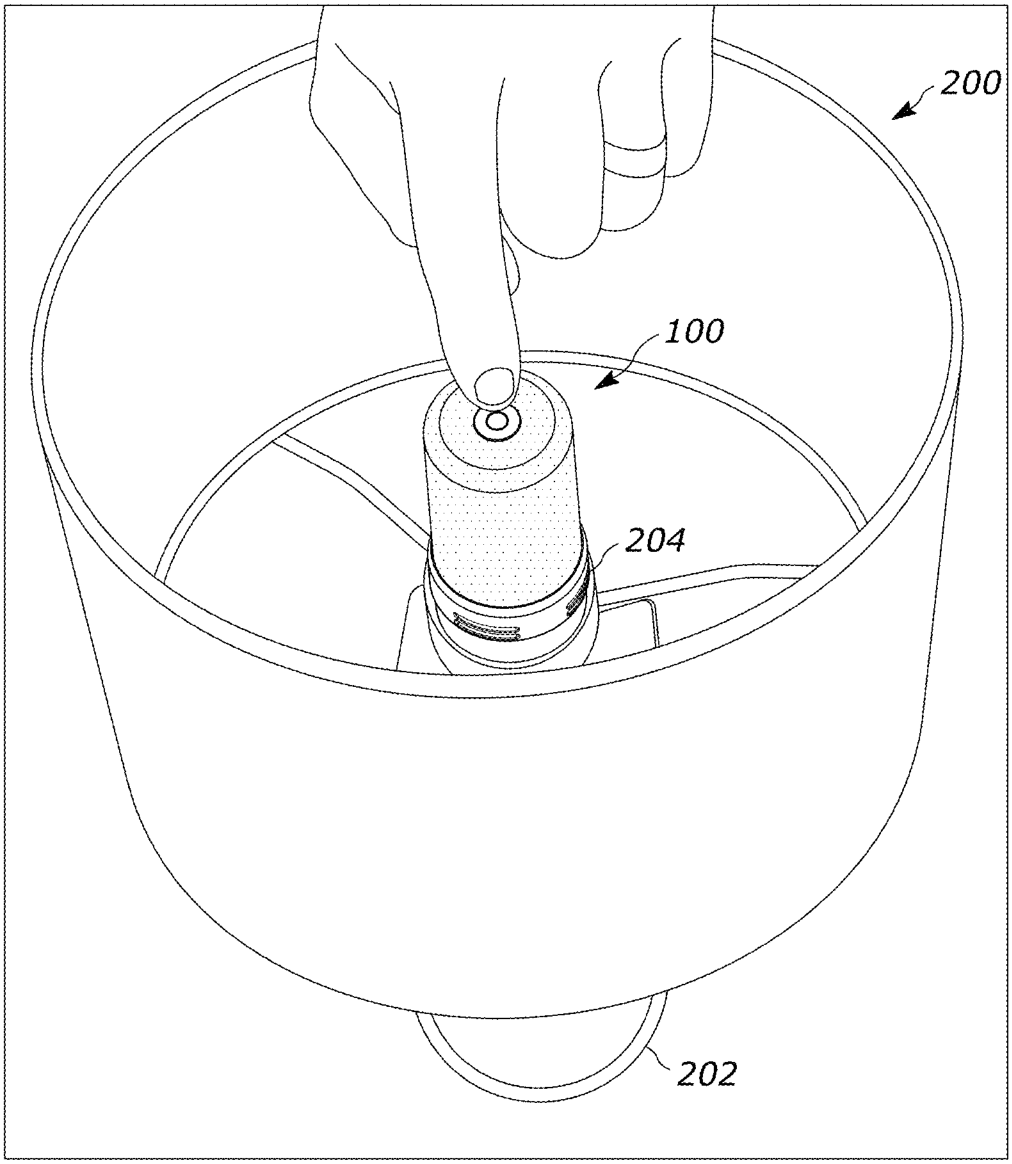
FIG. 17 shows the rechargeable luminaire in use and coupled to the cordless light fixture.

FIGS. 15-17 illustrate the rechargeable luminaire 100 used in connection with one example of a cordless light fixture 200 constructed in accordance with the teachings of the present disclosure. In the present example, the cordless light fixture 200 is a cordless lamp that has, in relevant part, a base 202 and a luminaire holder 204 coupled to the base 202. The base 202 is adapted to rest on a surface (e.g., a table) and support the rest of the cordless lamp. Meanwhile, the luminaire holder 204, which in the present example is coupled to a lamp shade, is a receptacle that is sized to receive and retain the rechargeable luminaire 100 therein. In the present example, the luminaire holder 204 is fixedly coupled to the base 202 and is magnetic, such that luminaire holder 204 is configured to magnetically interact with the magnetic material of the housing 104 and/or the magnet 140 disposed within the housing 104, thereby magnetically coupling the luminaire holder 204 to the housing 104 (and vice-versa). To this end, the luminaire holder 204 is at least partially made of a magnetic material and/or includes a permanent magnet fixedly attached to an inner surface of the luminaire holder 204. In other examples, however, the rechargeable luminaire 100 can be used with a different cordless light fixture, including but not limited to a chandelier, a hanging pendant light, an electric candle, floor lamp, or any other suitable alternative. Moreover, in other examples, the luminaire holder 204 can be removably coupled to the base 202, such that the luminaire holder 204 can be removed from the base 202 and utilized with a different base or independently of a base.

In FIGS. 15 and 16, the rechargeable luminaire 100 is shown decoupled from and placed adjacent to the cordless light fixture 200. The rechargeable luminaire 100 can nonetheless be placed in the fully lit mode, the first partially lit mode, or the second partially lit mode utilizing the dimmer 124. At the same time, or when the rechargeable luminaire 100 is placed in the off mode, the battery 128 of the rechargeable luminaire 100 can be charged/recharged by electrically connecting the port 112 to a power source (e.g., a wall outlet).

FIG. 17 then illustrates the rechargeable luminaire 100 coupled to the cordless lamp 200. More particularly, the rechargeable luminaire 100 is partially disposed in the luminaire holder 204 such that the magnetic portion of the housing 104 and/or the magnet 140 are magnetically coupled to the luminaire holder 204. In turn, the rechargeable luminaire 100 can be placed in the fully lit mode, the first partially lit mode, or the second partially lit mode, such that light is emitted from the rechargeable luminaire 100 and into the environment surrounding the cordless lamp 200. Alternatively, of course, the rechargeable luminaire 100 can be placed in the off mode while coupled to the cordless lamp 200. Beneficially, because the cordless lamp 200 does not include a cord, the cordless lamp 200 and the rechargeable luminaire 100 can be moved to a different location within the environment without having to turn off the cordless lamp 200. Moreover, while in the present example the rechargeable luminaire 100 is only chargeable in the uncoupled state (i.e., when decoupled from the cordless lamp 200), one of ordinary skill in the art will understand that the rechargeable luminaire 100 may be charged via an internal battery within the cordless light fixture 200. Additionally, while in the uncoupled state, one of skill in the art would understand the rechargeable luminaire 100 is chargeable on its own (e.g., via the charging port 112) or in a charging station that accommodates one or multiple rechargeable luminaires 100 simultaneously.

Figure 18A:
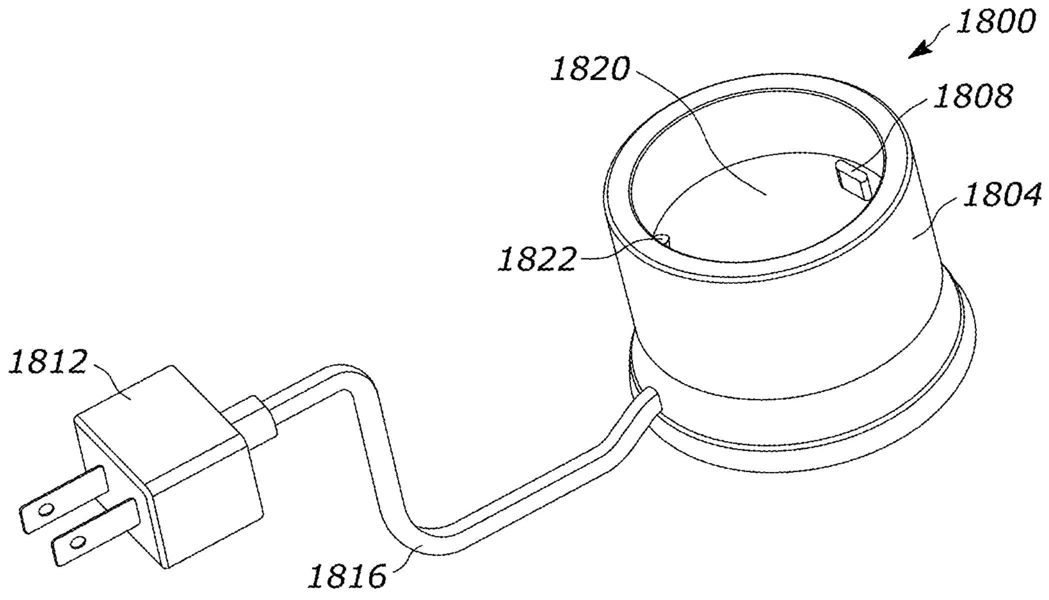
FIGS. 18A-18C illustrate one example of a charging station that is constructed in accordance with the teachings of the present disclosure and configured to hold and recharge the rechargeable luminaire.
Figure 18B:
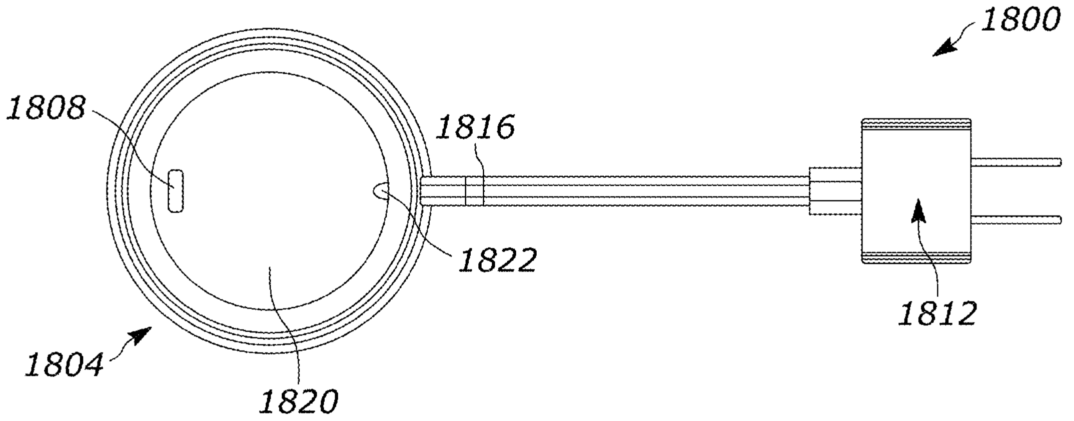
Figure 18C:
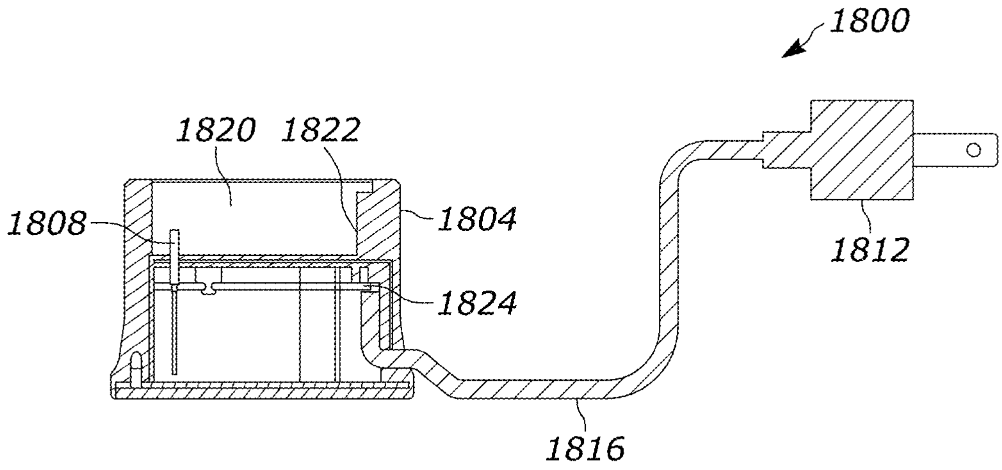
Figure 19A:
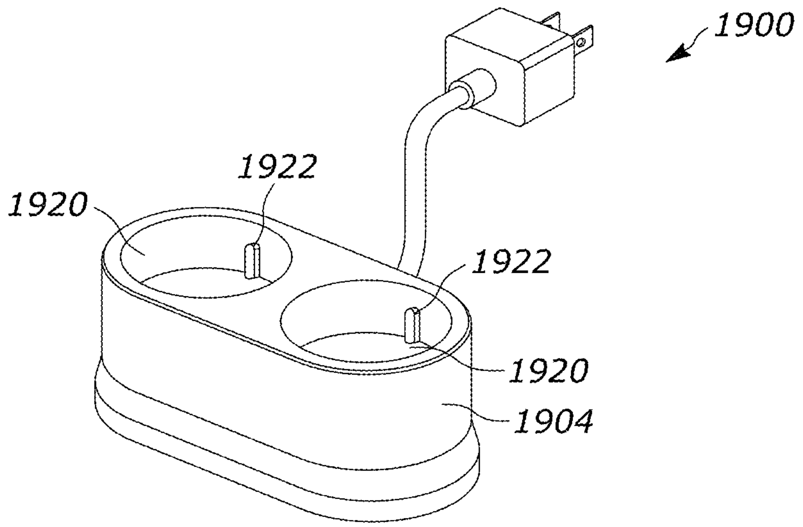
FIGS. 19A-19D illustrate another example of a charging station that is constructed in accordance with the teachings of the present disclosure and configured to hold and recharge the rechargeable luminaire.
Figure 19B:
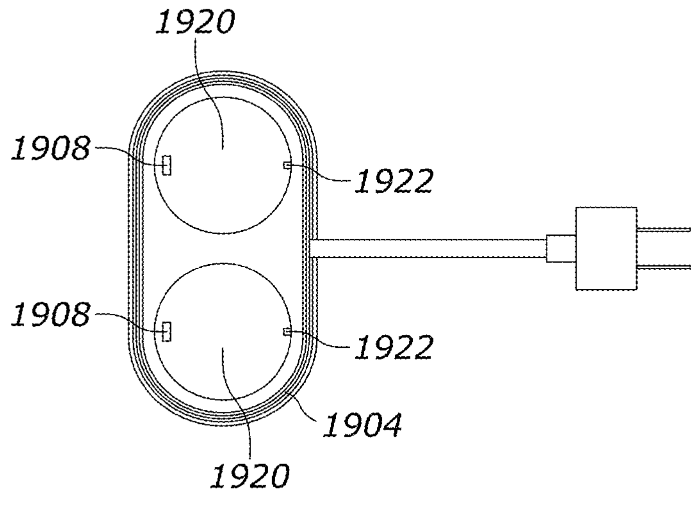
Figure 19C:
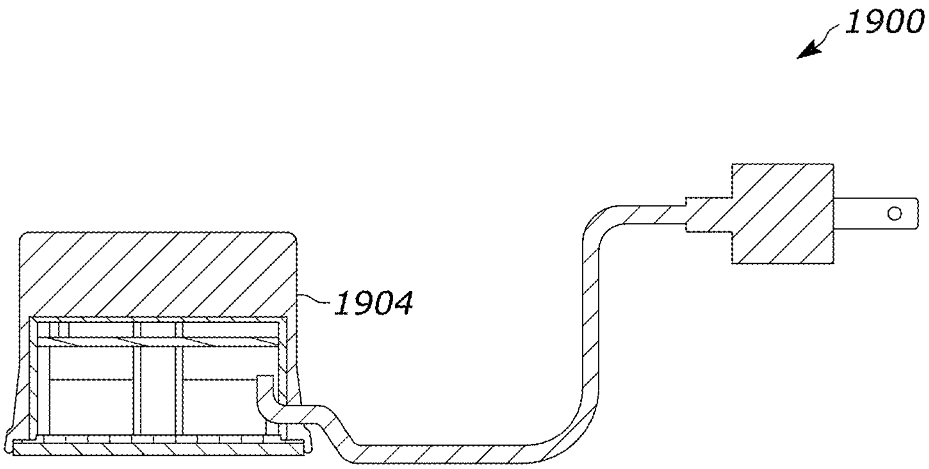
Figure 19D:
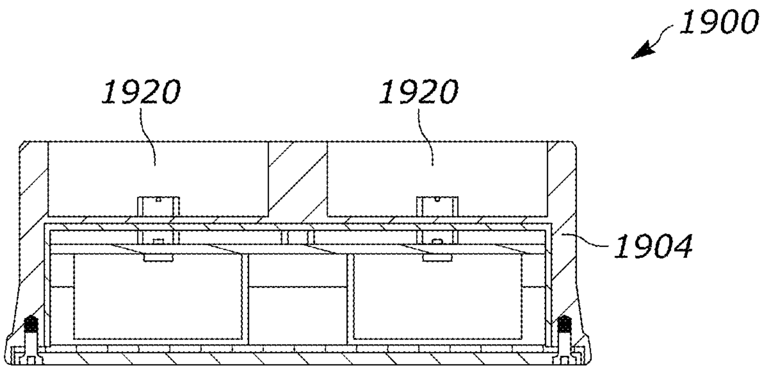
Figure 20A:
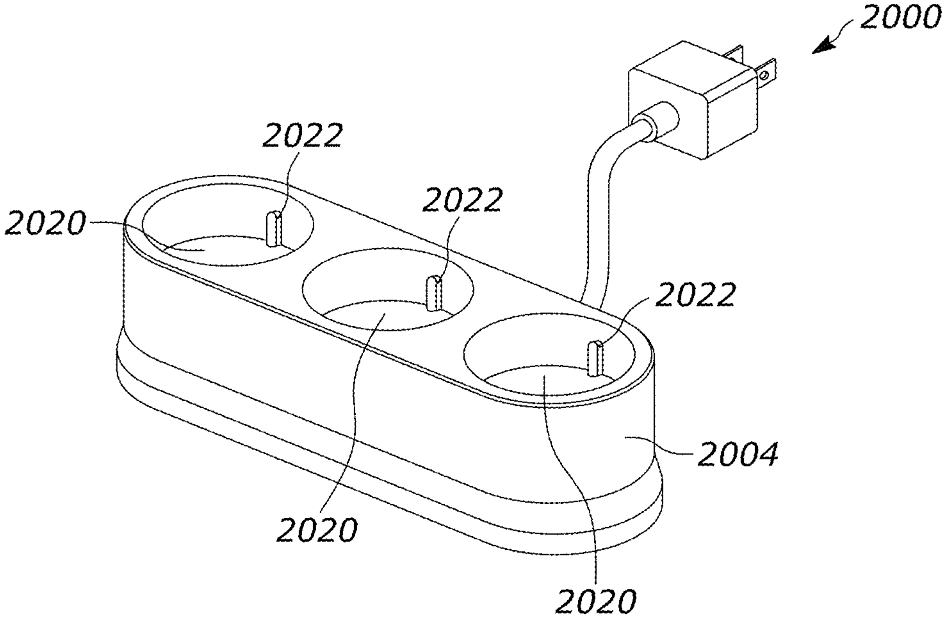
FIGS. 20A-20D illustrate another example of a charging station that is constructed in accordance with the teachings of the present disclosure and configured to hold and recharge the rechargeable luminaire.
Figure 20B:
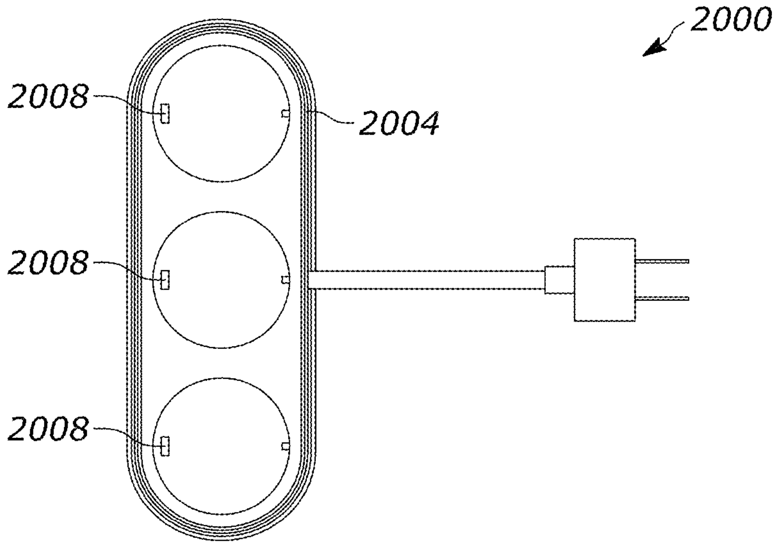
Figure 20C:
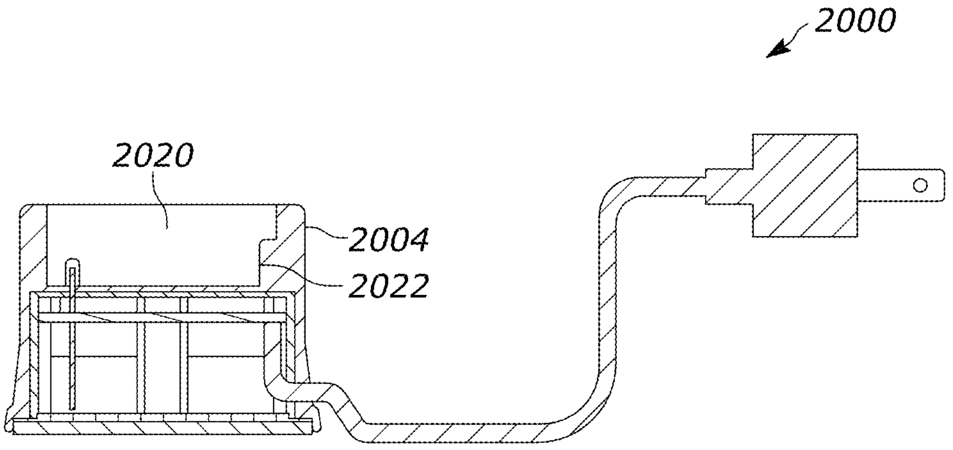
Figure 20D:
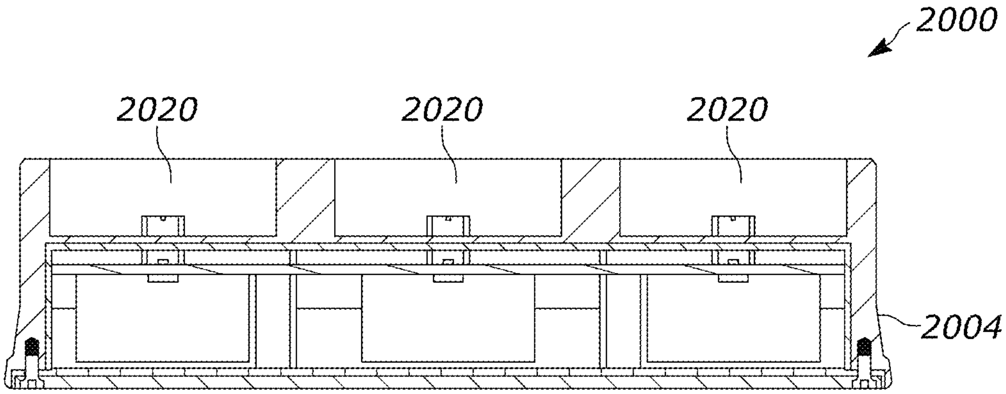
Figure 21A:
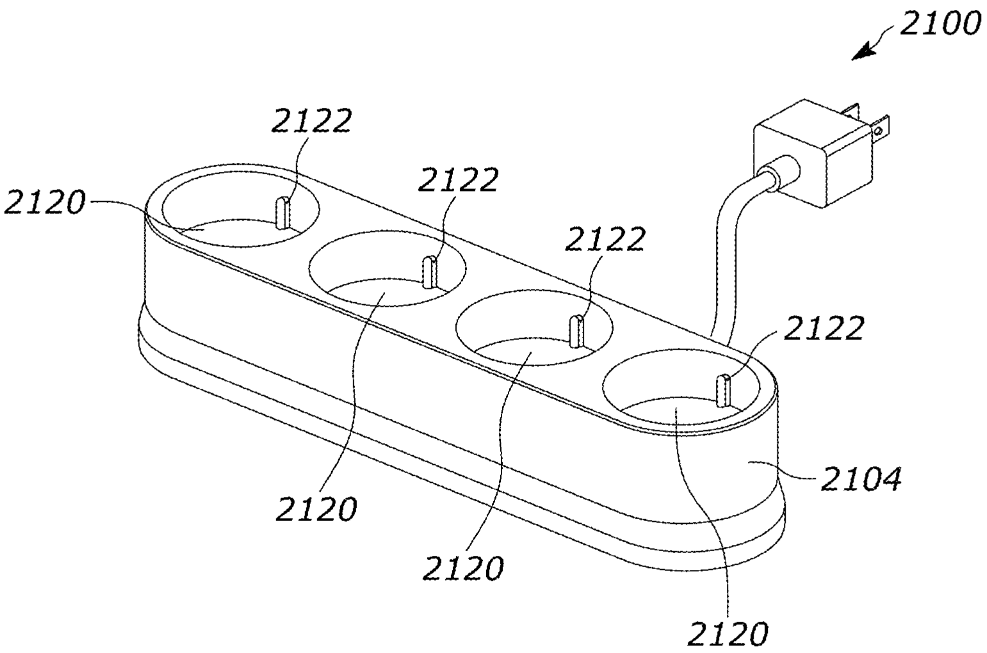
FIGS. 21A-21D illustrate another example of a charging station that is constructed in accordance with the teachings of the present disclosure and configured to hold and recharge the rechargeable luminaire.
Figure 21B:
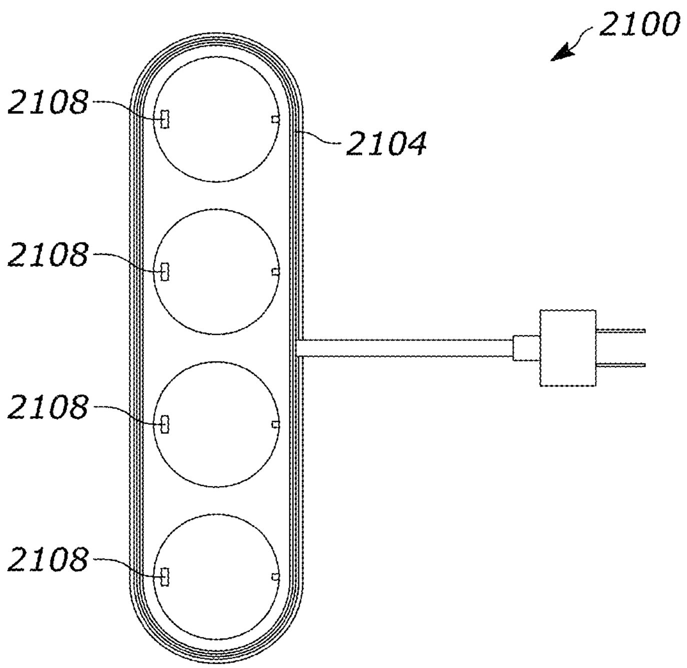
Figure 21C:
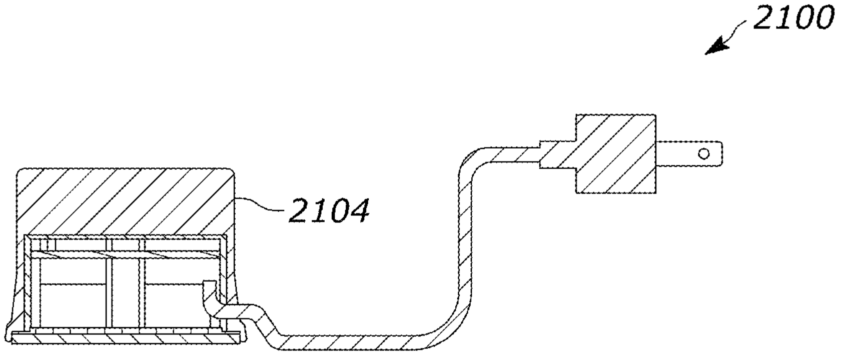
Figure 21D:
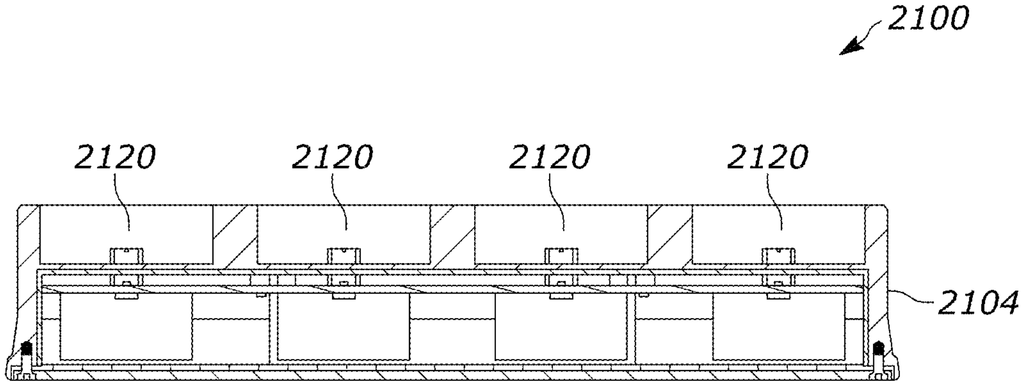

FIGS. 18A-18C illustrate one example of a charging station 1800 that can be used to hold and recharge one rechargeable luminaire (e.g., the rechargeable luminaire 100) when not in use and/or a battery of that rechargeable luminaire (e.g., battery 128) is low or dead. The charging module 1800 generally includes a base 1804, an electrical connector 1808 coupled to the base 1804, a universal plug 1812, and a cord 1816 that electrically connects the universal plug 1812 to the base 1804 (and to the electrical connector 1808). The base 1804 is preferably made of an aluminum alloy (e.g., die cast A383 or ADC12) or machined from brass and includes an opening 1820 that is generally sized and shaped to receive and retain a portion of the rechargeable luminaire. In the present example, the opening 1820 is circular and is sized to receive and retain a housing of the rechargeable luminaire (e.g., the housing 104) therein. The base 1804 also optionally includes a projection 1822 that extends into the opening 1820 and is sized to be disposed in a notch of the rechargeable luminaire (e.g., the notch 116) so as to help align and retain the rechargeable luminaire in the opening 1820. The electrical connector 1808 is configured to engage a charging port of the rechargeable luminaire (e.g., charging port 112) when the rechargeable luminaire is at least partially disposed in the opening 1820 so as to recharge the battery of the rechargeable luminaire. In the present example, the electrical connector 1808 is a USB-C type connector that protrudes outward (upward in FIGS. 18A and 18C) from a surface of the base 1804 that partially defines the opening 1820. Thus, for example, the electrical connector 1808 is configured to be inserted into the USB-C port 112 formed in the housing 104 of the rechargeable luminaire 100 when the housing 104 is disposed in the opening 1820 so as to recharge the battery 128 of the luminaire. In other examples, however, the electrical connector 1808 can instead be a USB-A, USB-B, USB-B Mini, USB-B Micro, or a Lighting connector configured to be inserted into a corresponding port formed in the housing 104 when the housing 104 is disposed in the opening. The universal plug 1812, meanwhile, is configured to engage a standard electrical outlet (e.g., a wall outlet). Finally, the cord 1816 electrically connects the universal plug 1812 to the base 1804 (and to the electrical connector 1808) via a printed circuit board 1824 arranged in the base 1804.

FIGS. 19A-19D illustrate another example of a charging station 1900 that is structurally and functionally similar to the charging station 1800 but can be used to hold and recharge two rechargeable luminaires (instead of one) side by side. To that end, the charging station 1900 includes two openings 1920 (one for each of the two rechargeable luminaires), two electrical connectors 1908, one in each opening 1920, and two projections 1922, one in each opening 1920. Like the electrical connector 1808, each of the electrical connectors 1908 is a USB-C type connector that protrudes outward from a surface of the base 1904 that partially defines the respective opening 1920, though one or both of the electrical connectors 1908 can instead be a different type of connector that utilizes a different charging standard.

FIGS. 20A-20D illustrate another example of a charging station 2000 that is structurally and functionally similar to the charging station 1800 but can be used to hold and recharge three rechargeable luminaires (instead of one). To that end, the charging station 2000 includes three openings 2020 (one for each of the three rechargeable luminaires), three electrical connectors 2008, one in each opening 2020, and three projections 2022, one in each opening 2020. Like the electrical connector 2008, each of the electrical connectors 2008 is a USB-C type connector that protrudes outward from a surface of the base 2004 that partially defines the respective opening 2020, though one or both of the electrical connectors 2008 can instead be a different type of connector that utilizes a different charging standard.

FIGS. 21A-21D illustrate another example of a charging station 2100 that is structurally and functionally similar to the charging station 1800 but can be used to hold and recharge four rechargeable luminaires (instead of one). To that end, the charging station 2100 includes three openings 2120 (one for each of the four rechargeable luminaires), four electrical connectors 2108, one in each opening 2120, and three projections 2122, one in each opening 2120. Like the electrical connector 2108, each of the electrical connectors 2108 is a USB-C type connector that protrudes outward from a surface of the base 2104 that partially defines the respective opening 2120, though one, two, or all three of the electrical connectors 2108 can instead be a different type of connector that utilizes a different charging standard.

Figure 22:
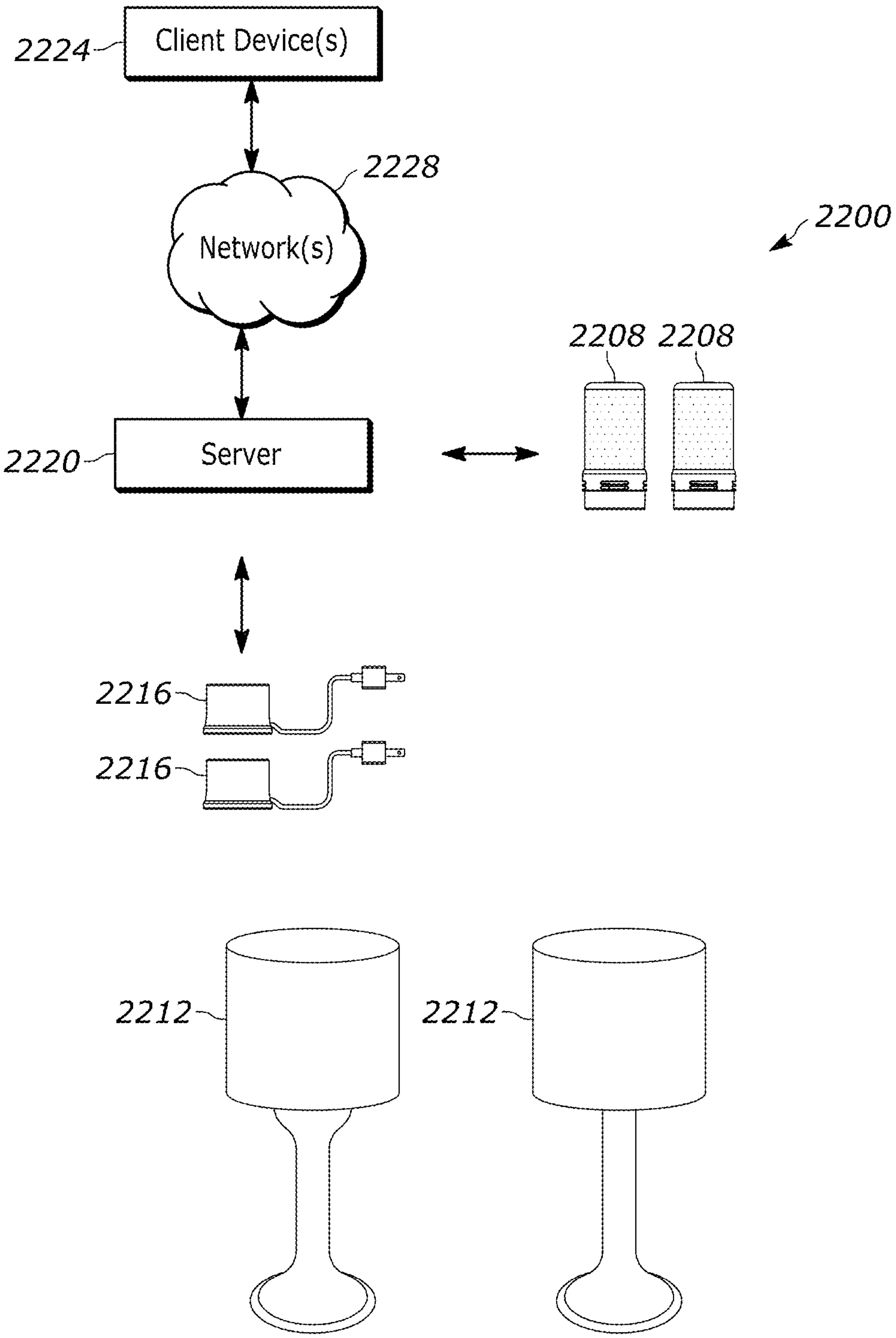
FIG. 22 illustrates one example of a lighting system that is constructed in accordance with the teachings of the present disclosure and includes a plurality of rechargeable luminaires, a plurality of charging stations, a plurality of light fixtures, and a plurality of client devices that can be used to control the luminaires, the charging stations, and the light fixtures.

FIG. 22 illustrates one example of a lighting system 2200 that may be implemented or included in an environment, such as, for example, a bedroom, an office, a basement, a living room, a family room, a patio, or other space or building, combinations or portions thereof, where it is desirable to flexibly provide illumination. The lighting system 2200 illustrated in FIG. 22 generally includes a plurality of rechargeable luminaires 2208, a plurality of light fixtures 2212, one or more charging stations 2216, a server 2220, and one or more client devices 2224 configured to connect to the server 2220 via one or more networks 2228. However, if desired, the lighting system 2220 can include more or less components and/or different components. For example, the lighting system 2220 can include a single light fixture 2212 or a single client device 2224. As another example, the lighting system 2200 need not include the server 2220 (in which case the one or more client devices 2224 can connect directly to the plurality of rechargeable luminaires 2208, the plurality of light fixtures 2212, and/or the one or more charging stations 2216 via the one or more networks 2228).

Each of the rechargeable luminaires 2208 utilized in or at the environment takes the form of one of the rechargeable luminaires described herein (e.g., the rechargeable luminaire 100). In some cases, each of the rechargeable luminaires 2208 utilized in or at the environment can be identical. However, in other examples, one or more of the rechargeable luminaires 2208 can vary in shape, size, and/or other features from one or more of the other rechargeable luminaires 2208. The plurality of light fixtures 2212 utilized in or at the environment can include one or more of the light fixtures described herein. For example, the plurality of light fixtures 2212 can include one or more cordless lamps 200 and/or one or more different cordless light fixtures (e.g., a chandelier, a hanging light pendant light, an electric candle, or a floor lamp). Likewise, the one or more charging stations 2216 utilized in or at the environment can include one or more of the charging stations described herein. For example, while the lighting system 2200 illustrated in FIG. 22 includes two charging stations 1800, the one or more charging stations 2216 can include one or more of the charging stations 1800, 1900, 2000, 2100, depending upon the number of rechargeable luminaires 2208 that need to be recharged.

The server 2220 may be any type of server, such as, for example, an application server, a database server, a file server, a web server, or other server). The server 2220 may include one or more computers and/or may be part of a larger network of servers. The server 2220 can be located remotely (e.g., in the "cloud") from the luminaires 2208 and the client devices 2224 and may include one or more processors, controller modules (e.g., a central controller), or the like that are configured to facilitate various communications and commands among the luminaires 2208, the light fixtures 2212, the one or more charging stations 2216, and the client devices 2224. As such, the server 2220 can, for example, generate and send commands or instructions to the rechargeable luminaires 2208 to implement various sets of lighting settings corresponding to operation of the rechargeable luminaires 2208. Each set of lighting settings may include various parameters or settings including, for example, lighting states, spectral characteristics, output wattages, intensities, timeouts, and/or the like, whereby each set of lighting settings may also include a schedule or table specifying which settings should be used based on the time of day, day or week, natural light levels, occupancy, and/or other parameters. If desired, the server 2220 can also generate and send commands or instructions to the light fixtures 2212 and/or the one or more charging stations 2216 to implement various lighting settings corresponding to operation of the light fixtures 2212 and/or the one or more charging stations 2216.

The network(s) 2228 may be any type of wired, wireless, or wireless and wired network, such as, for example, a wide area network (WAN), a local area network (LAN), a personal area network (PAN), or other network. The network(s) 2228 can facilitate any type of data communication via any standard or technology (e.g., BLE, Zigbee, Z-Wave, GSM, CDMA, TDMA, WCDMA, LTE, EDGE, OFDM, GPRS, EV-DO, UWB, IEEE 802 including Ethernet, WiMAX, WiFi, Bluetooth®, and others). The client device(s) 2224 may be any type of electronic device, such as a smartphone, a desktop computer, a remote control, a laptop, a tablet, a phablet, a smart watch, smart glasses, wearable electronics, a pager, a personal digital assistant, or any other electronic device. The client device(s) 2224 may support a graphical user interface (GUI), whereby a user of the client device(s) 2224 may use the GUI to select various operations, change settings, view operation statuses and reports, make updates, configure email/text alert notifications, and/or perform other functions. The client device(s) 2224 may transmit, via the network(s) 2228 and the server 2220, any updated light settings to the rechargeable luminaires 2208 (or the light fixtures 2212) for implementation and/or storage thereon.

The invention claimed is:

1. A rechargeable luminaire configured for use with a cordless light fixture, comprising:

a housing;

a diffuser configured to diffuse light in a predetermined manner;

wherein the diffuser is coupled to the housing to form an enclosed stand-alone assembly, a battery disposed within the enclosed stand-alone assembly;

a light source powered by the battery and disposed within the enclosed stand-alone assembly; and a heat sink disposed within the enclosed stand-alone assembly and adjacent to the battery and the light source to dissipate heat generated by the light source and the battery, wherein the light source at least partially circumferentially surrounds the heat sink, and wherein the battery is at least partially disposed within the light source.

2. The rechargeable luminaire of claim 1, wherein the housing encloses a magnet and/or is formed of a magnetic material.

3. The rechargeable luminaire of claim 1, wherein the housing has a substantially cylindrical shape defined by a closed end and an open end opposite the closed end, and wherein the housing is coupled to the diffuser at the open end.

4. The rechargeable luminaire of claim 1, further comprising a dimmer carried by the housing, wherein the dimmer reconfigures the enclosed stand-alone assembly between a first lighting state associated with a fully lit mode, a second lighting state associated with a partially lit mode, and a third lighting state associated with a fully off mode.

5. The rechargeable luminaire of claim 1, wherein the heat sink is a hollow cylinder that extends from a first end to a second end, each of the first and second ends being open ends.

6. The rechargeable luminaire of claim 5, wherein the light source comprises a plurality of LEDs circumferentially surrounding the battery and extending at least partially between the first end and the second end of the heat sink.

7. The rechargeable luminaire of claim 1, wherein the heat sink circumferentially surrounds the battery.

8. The rechargeable luminaire of claim 1, wherein the heat sink is composed of aluminum and the diffuser is composed of white glass.

9. A lighting system configured for portable use, comprising:

the rechargeable luminaire of claim 1; and a cordless light fixture comprising a magnetic holder configured to be magnetically coupled to the rechargeable luminaire to releasably couple the rechargeable luminaire to the cordless light fixture, wherein the magnetic holder comprises a receptacle sized to receive and magnetically retain a portion of the rechargeable luminaire therein.

10. The lighting system of claim 9, wherein the rechargeable light source is chargeable in an uncoupled state relative to the cordless light fixture.

11. The lighting system of claim 9, wherein the rechargeable luminaire further comprises a housing formed of a magnetic material and/or enclosing a magnet that magnetically interacts with the magnetic holder to releasably couple the rechargeable luminaire to the cordless light fixture.

12. The lighting system of claim 11, further comprising a charging station configured to hold and recharge the rechargeable luminaire, the charging station comprising a base including an opening sized to receive and retain the housing of the rechargeable luminaire therein.

13. The lighting system of claim 9, wherein the magnetic holder is formed of a magnetic material and/or encloses a magnet.

14. A light assembly configured for use with a cordless light fixture, comprising:

a rechargeable luminaire, comprising:

a housing;

a diffuser configured to diffuse light in a predetermined manner; and a dimmer;

wherein the diffuser is coupled to the housing and the dimmer to form an enclosed stand-alone assembly, a battery disposed within the enclosed stand-alone assembly;

a light source powered by the battery and disposed within the enclosed stand-alone assembly; and a heat sink disposed within the enclosed stand-alone assembly and adjacent to the battery and the heat sink to dissipate heat generated by the light source and the battery, wherein the heat sink is a hollow cylinder that extends from a first end to a second end, wherein the light source extends at least partially between the first end of the heat sink and the second end of the heat sink, wherein the dimmer reconfigures the enclosed stand-alone assembly between a plurality of lighting states having different lighting levels, and wherein the battery is at least partially disposed within the light source; and a magnetic holder adapted to be coupled to the cordless light fixture, wherein the magnetic holder is configured to be magnetically coupled to the housing to releasably couple the rechargeable luminaire to the magnetic holder, and wherein the magnetic holder comprises a receptacle sized to receive and retain a portion of the rechargeable luminaire therein.

15. The light assembly of claim 14, wherein the housing encloses a magnet and/or is formed of a magnetic material that magnetically interacts with the magnetic holder.

16. The light assembly of claim 14, wherein the housing has a substantially cylindrical shape defined by a closed end and an open end opposite the closed end, and wherein the housing is coupled to the diffuser at the open end.

17. The light assembly of claim 14, wherein the dimmer reconfigures the enclosed stand-alone assembly between a first lighting state associated with a fully lit mode, a second lighting state associated with a partially lit mode, and a third lighting state associated with a fully off mode.

18. The light assembly of claim 14, wherein the heat sink is cylindrical and open at both ends.

19. The light assembly of claim 14, wherein the heat sink circumferentially surrounds the battery.

20. The light assembly of claim 14, wherein the heat sink is composed of aluminum and the diffuser is composed of white glass.

21. The light assembly of claim 14, wherein the light source comprises a plurality of light-emitting diodes circumferentially surrounding the heat sink.

22. A rechargeable luminaire configured for use with a cordless light fixture, comprising:

a housing;

a diffuser configured to diffuse light in a predetermined manner; and a dimmer;

wherein the diffuser is coupled to the housing and the dimmer to form an enclosed stand-alone assembly, a battery disposed within the enclosed stand-alone assembly;

a light source powered by the battery and disposed within the enclosed stand-alone assembly; and a heat sink disposed within the enclosed stand-alone assembly and adjacent to the battery and the heat sink to dissipate heat generated by the light source and the battery, wherein the heat sink is a hollow cylinder that extends from a first end to a second end, wherein the light source extends at least partially between the first end of the heat sink and the second end of the heat sink, wherein the light source comprises a plurality of LEDs disposed around an outer surface of the heat sink such that the light source circumferentially surrounds the heat sink, wherein the dimmer reconfigures the enclosed stand-alone assembly between a plurality of lighting states having different lighting levels, and wherein the battery is at least partially disposed within the light source and the hollow cylinder.

* * * * *